United States Patent
Zhao et al.

(10) Patent No.: US 12,452,443 B2
(45) Date of Patent: *Oct. 21, 2025

(54) TRANSFORM FOR L-SHAPED PARTITION

(71) Applicant: Tencent America LLC, Palo Alto, CA (US)

(72) Inventors: Liang Zhao, Sunnyvale, CA (US); Xin Zhao, San Jose, CA (US); Madhu Peringassery Krishnan, Mountain View, CA (US); Shan Liu, San Jose, CA (US)

(73) Assignee: Tencent America LLC, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/666,752

(22) Filed: May 16, 2024

(65) Prior Publication Data
US 2024/0305805 A1    Sep. 12, 2024

Related U.S. Application Data

(63) Continuation of application No. 17/234,507, filed on Apr. 19, 2021, now Pat. No. 12,047,593.
(Continued)

(51) Int. Cl.
*H04N 19/44* (2014.01)
*H04N 19/119* (2014.01)
(Continued)

(52) U.S. Cl.
CPC ........... *H04N 19/44* (2014.11); *H04N 19/119* (2014.11); *H04N 19/132* (2014.11); *H04N 19/176* (2014.11); *H04N 19/60* (2014.11)

(58) Field of Classification Search
None
See application file for complete search history.

(56) References Cited

U.S. PATENT DOCUMENTS

| | | |
|---|---|---|
| 2010/0195715 A1 | 8/2010 | Liu et al. |
| 2012/0082232 A1 | 4/2012 | Sole et al. |

(Continued)

FOREIGN PATENT DOCUMENTS

| | | |
|---|---|---|
| CN | 105934948 A | 9/2016 |
| CN | 111034197 A | 4/2020 |

(Continued)

OTHER PUBLICATIONS

Office Action received for Chinese Patent Application No. 202180006202.5, mailed on Jul. 2, 2024, 14 pages (5 pages of English Translation and 9 pages of Original Document).
(Continued)

*Primary Examiner* — Dave Czekaj
*Assistant Examiner* — Shanika M Brumfield
(74) *Attorney, Agent, or Firm* — ArentFox Schiff LLP

(57) ABSTRACT

In a method for video decoding in a decoder, transform coefficients associated with a coding block that is an L-shaped partition of a picture are decoded, by a processor and from a coded video bitstream. The L-shaped partition of the picture is partitioned into a plurality of rectangular sub-blocks when the coding block is the L-shaped partition, each corner of the L-shaped partition being a right angle. Residuals of each of the plurality of rectangular sub-blocks in the coding block are determined, by the processor, based on the transform coefficients of the respective rectangular sub-block. Samples of the coding block are reconstructed, by the processor, based on the residuals of the coding block.

20 Claims, 28 Drawing Sheets

Related U.S. Application Data

(60) Provisional application No. 63/087,042, filed on Oct. 2, 2020.

(51) Int. Cl.
*H04N 19/132* (2014.01)
*H04N 19/176* (2014.01)
*H04N 19/60* (2014.01)

(56) References Cited

U.S. PATENT DOCUMENTS

| | | |
|---|---|---|
| 2013/0003824 A1 | 1/2013 | Guo et al. |
| 2017/0244964 A1 | 8/2017 | Liu et al. |
| 2017/0353730 A1 | 12/2017 | Liu et al. |
| 2018/0241992 A1 | 8/2018 | Zhang et al. |
| 2019/0273921 A1 | 9/2019 | Abe et al. |
| 2020/0007882 A1 | 1/2020 | Abe et al. |
| 2020/0389651 A1 | 12/2020 | Reuze et al. |
| 2021/0168409 A1 | 6/2021 | Furht et al. |
| 2021/0392322 A1 | 12/2021 | Chiang et al. |

FOREIGN PATENT DOCUMENTS

| | | | |
|---|---|---|---|
| JP | 2017-505025 A | 2/2017 | |
| WO | 2019/039324 A1 | 2/2019 | |
| WO | WO-2022114752 A1 * | 6/2022 | ........... H04N 19/119 |

OTHER PUBLICATIONS

Zhang et al., "Fast Adaptive Multiple Transform for Versatile Video Coding", IEEE Data Compression Conference (DCC), 2019 (10 pages).
Zhang et al., "Fast DST-7/DCT-8 with Dual Implementation Support for Versatile Video Coding", IEEE Transactions on Circuits and Systems for Video Technology, 2020 (17 pages).
Zhao et al., "Low-Complexity Intra Prediction Refinements for Video Coding", IEEE, 2018 (5 pages).
Zhao et al.—CE6: Fast DST-7/DCT-8 with dual implementation support (Test 6.2.3), Joint Video Experts Team (JVET) of ITU-T SG 16 WP3 and ISO-IEC JTC 1/SC 29/WG 11, Document JVET-M0497, 13th Meeting: Marrakech, MA, Jan. 9-18, 2019 (11 pages).
Zhao et al.—"CE6-related: Unified LFNST using block size independent kernel", Joint Video Experts Team (JVET) of ITU-T SG 16 WP3 and ISO/IEC JTC 1/SC 29/WG11, Document: JVET_00539-v2, 15th Meeting: Gothenburg, SE, Jul. 3-12, 2019 (13 page).
Zhao et al., "CE6: On 8-bit primary transform core (Test 6.1.3)", Joint Video Experts Team (JVET) of ITU-T SG 16 WP3 and ISO-IEC JTC 1/SC 29/WG 11, Document: JVET-L0285, 12th Meeting: Macao, CN Oct. 3-12, 2018 (17 pages).
Zhao et al., "Coupled Primary and Secondary Transform for Next Generation Video Coding", IEEE, 2018 (4 pages).
Zhao et al., "Joint Separable and Non-Separable Transforms for Next-Generation Video Coding", IEEE, 2018 (13 pages).
Zhao et al., Novel Statistical Modeling, Analysis and Implementation of Rate-Distortion Estimation for H.264/AVC Coders, IEEE Transactions on Circuits and Systems for Video Technology, vol. 20, No. 5, May 2010 (14 pages).
Zhao et al., NSST: Non-Separable Secondary Transforms for Next Generation Video Coding••, IEEE, 2016 (5 pages).
Zhao et al., "Wide Angular Intra Prediction for Versatile Video Coding", IEEE. Data Compression conference (DCC), 2019 (10 pages).
Zhao et al., "CE6: On 8-bit primary transform core (Test 6.1.3)" Joint Video Experts Team (JVET) of ITU-T SG 16 WP3 and ISO/IEC JTC 1/SC 29/WG11, Document: JVET-L0285-r1, 12th Meeting: Macao, CN Oct. 3-12, 2018 (17 pages).
Zhao et al.—"CE3-related: Unified MPM list based on CE3-3.3 and CE3-3.5.1", Joint Video Experts Team {JVET) of ITU-T SG 16 WP3 and ISO/IEC JTC 1/SC 29/WG11, Document JVET-N0394-r2, 14th Meeting: Geneva, CH, Mar. 19-27, 2019 (11 pages).
Zhao et al.—"Non-CE6: Configurable max transform size in WC", Joint Video Experts Team (JVET) of ITU-T SG 16 WP3 and ISO/IEC JTC 1/SC 29/WG11, Document: JVET-O0545-v2, 15tl1 Meeting: Gothenburg, SE, Jul. 3-12, 2019 (6 pages).
Appendix O, JVET-M0497-CE6-2-3a, 48(pages).
Appendix A, JVET-K0500-BMS (22 pages).
Appendix AA, JVET-N0394-test 1 (32 pages).
Appendix AB, JVET-N0394-test 2 (32 pages).
Appendix AC, JVET-N0394-test 3 (31 pages).
Appendix AD, JVET-N0394-test 4 (31 pages).
Appendix AE, JVET-N0394-test 5 (31 pages).
Appendix AF, JVET-N0394-test 6 (32 pages).
Appendix AG, JVET-N0394-test 7 (31 pages).
Appendix B. JVET-K0500-VTM (22 pages).
Appendix C, JVET-K0500-VTM-NoBF (18 pages).
Appendix D, JVET-L0283_CE3-1.1.1-VTM (28 pages).
Appendix E, JVET-L0283_CE3-1.1.2-VTM (29 pages).
Appendix F, JVET-L0283_CE3-1.1.3_C1-VTM (30 pages).
Appendix G, JVET-L0283_CE3-1.1.3_C2-VTM (32 pages).
Appendix H, JVET-L0283_CE3-1.1.3_CE-VTM (28 pages).
Appendix I, JVET-L0283_CE3-1.1.3-VTM (32 pages).
Appendix J, JVET-L0283_CE3-1.1.4-VTM (32 pages).
Appendix K, JVET-L0285_CE6-1.3a (48 pages).
Appendix L, JVET-L0285_CE6-1.3a_LowQP (48 pages).
Appendix M, JVET-L0285_CE6-1.3b (48 pages).
Appendix N, JVET-L0285_CE6-1.3b_LowQP (48 pages).
Appendix P, JVET-M0497-CE6-2-3a_LowQP (68 pages).
Appendix Q, JVETO0539-vs-CE6-2.1a (30 pages).
Appendix R, JVET-O0539-vs-CE6-2.1a-LowQP (30 pages).
Appendix S, JVET-O0539-vs-CE6-2.1b (30 pages).
Appendix T, JVET-O0539-vs-CE6-2.1b-LowQP (30pages).
Appendix U, JVET-O0539-vs-VTM5_r1 (35 pages).
Appendix V, JVET-O0539-vs-VTM5-LowQP_r1 (35pages).
Appendix W, JVET-O0545_Log2MaxTbSize=4 (36 pages).
Appendix X, JVET-O0545_Log2MaxTbSize=5 (36 pages).
Appendix Y, JVET-O0545_Log2MaxTbSize=6 (36 pages).
Appendix Z, JVET-N0394 (13 pages).
Bross et al., "CE3: Multiple reference line intra prediction (Test 1.1.1, 1.1.2, 1.1.3 and 1.1.4)" Joint Video Experts Team (JVET) of ITU-T SG 16 WP3 and ISO/IEC JTC 1/SC 29/WG11, Document: JVET-L0283-v2, 121h Meeting: Macao, CN, Oct. 3-12, 2018 (7 pages).
Bross et al., "Versatile Video Coding (Draft 2)", Joint Video Experts Team (JVET) of ITU-T SG 16 WP3 and ISO/IEC JTC 1SC 29/WG 11, Document JVET-K1001-v6, 11th Meeting: Ljubljana, SI, Jul. 10-18, 2018 (137 pages).
Bross et al.—"Versatile Video Coding (Draft 6)", Joint Video Experts Team (JVET) of ITU-T SG 16 WP3 and ISO/IEC JTC 1/SC 29/WG11, Document: JVET-O2001-vE, 15t1, Meeting: Gothenburg, SE, Jul. 3-12, 2019, (456 pages).
Bross et al.. "General Video Coding Technology in Responses to the Joint Call for Proposals on Video Compression with Capability beyond HEVC", IEEE Transactions on Circuits and Systems for Video Technology, 2019 (16 pages).
Bross et al.. Versatile Video Coding (Draft 2), Joint Video Experts Team (JVET) of ITU-T SG 16 WP3 and ISO/IEC JTC 1/SC 29 WG 11, JVET-K1001-v6, 11th Meeting: Ljubljana, SI, Jul. 10-18, 2018 (136 pages).
Chang et al., "Intra predication using multiple reference lines for the versatile video coding standard", 2019 (8 pages).
Das Priyanka et al: "Coding Of Non-Rectangular Signals With Block-Based Transforms", 2020 IEEE International Conference on Image Processing (ICIP), Oct. 1, 2020 (Oct. 1, 2020), pp. 1-16.
International Search Report and Written Opinion issued in application PCT/US2021/044717 on Oct. 29, 2021, (15 pages).
Japanese Office Action dated Aug. 7, 2023 issued in corresponding application 2022-534445, pp. 1-17.
Racape et al., "CE3-related: Wide-angle intra prediction for non-square blocks", Joint Video Experts Team (JVET) of ITU-T SG 16 WP 3 and ISO/IEC JTC 1/SC 29/WG 11, JVET-K0500_r1, 11th Meeting: Ljubljana, SI, Jul. 10-18, 2018 (7 pages).
Racape et al., "CE3-related: Wide-angle intra prediction for non-square blocks", Joint Video Experts Team (JVET) of ITU-T SG 16

(56) References Cited

OTHER PUBLICATIONS

WP 3 and ISO/IEC JTC 1/SC 29/WG 11, JVET-K0500_r2, 11th Meeting: Ljubljana, SI, Jul. 10-18, 2018 (7 pages).
Racape et al., "CE3-related: Wide-angle intra prediction for non-square blocks", Joint Video Experts Team (JVET) of ITU-T SG 16 WP 3 and ISO/IEC JTC 1/SC 29/WG 11, JVET-K0500_r4, 11th Meeting: Ljubljana, SI, Jul. 10-18, 2018 (13 pages).
Racape et al., "CE3-related: Wide-angle intra prediction for non-square blocks", JVET-K0500 (9 pages).
Racape et al., "CE3-related: Wide-angle intra prediction for non-square blocks", Joint Video Experts Team (JVET) of ITU-T SG 16 WP 3 and ISO/IEC JTC 1/SC 29/WG 11, JVET-K0500_r3, 11th Meeting: Ljubljana, SI, Jul. 10-18, 2018 (12 pages).
Rivaz et al., "AV1 Bitstream & Decoding Process Specification", 2018 (681 pages).
Stasinski R et al: "Reduced-Complexity Shape-Adaptive DCT for Region-Based Image Coding", Proceedings of the 1998 International Conference on Image Processing. ICIP '98. Chicago, IL, Oct. 4-7, 1998; [International Conference On Image Processing], Los Alamitos, CA : IEEE Computer Soc, US, vol. CONF. 5, Oct. 4, 1998 (Oct. 4, 1998), pp. 114-118.
Supplementary European Search Report dated Nov. 29, 2022 issued in corresponding application 21876177.3, pp. 1-9.

\* cited by examiner

| Transform Size of Current Depth | Transform Size of Next Depth |
|---|---|
| TX_4×4 | TX_4×4 |
| TX_8×8 | TX_4×4 |
| TX_16×16 | TX_8×8 |
| TX_32×32 | TX_16×16 |
| TX_64×64 | TX_32×32 |
| TX_4×8 | TX_4×4 |
| TX_8×4 | TX_4×4 |
| TX_8×16 | TX_8×8 |
| TX_16×8 | TX_8×8 |
| TX_16×32 | TX_16×16 |
| TX_32×16 | TX_16×16 |
| TX_32×64 | TX_32×32 |
| TX_64×32 | TX_32×32 |
| TX_4×16 | TX_4×8 |
| TX_16×4 | TX_8×4 |
| TX_8×32 | TX_8×16 |
| TX_32×8 | TX_16×8 |
| TX_16×64 | TX_16×32 |
| TX_64×16 | TX_32×16 |

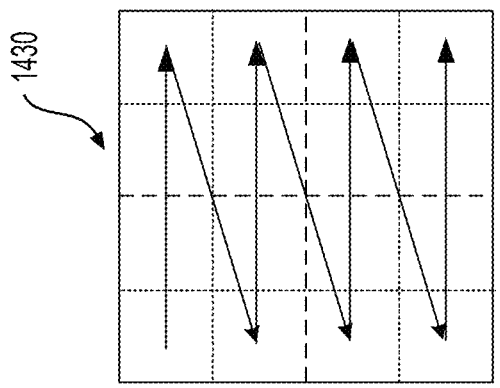
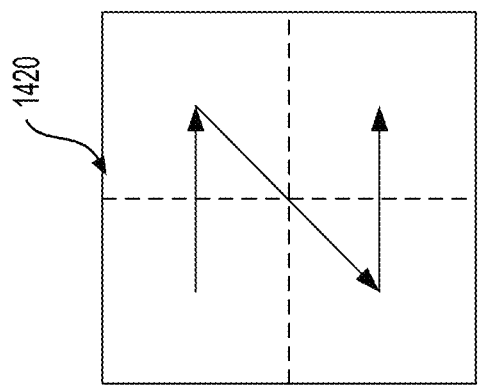
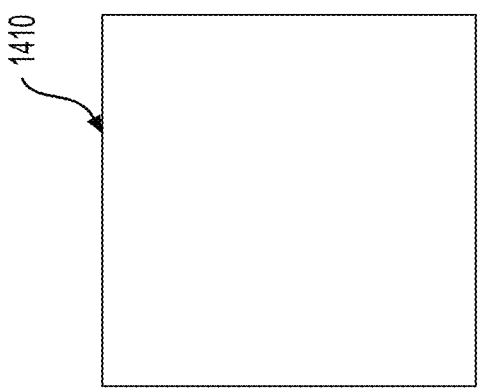
FIG. 14

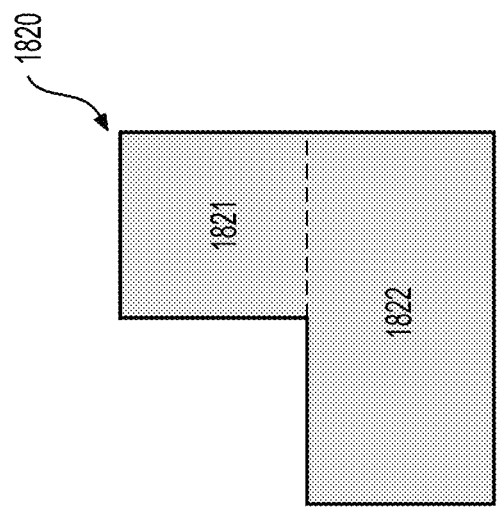
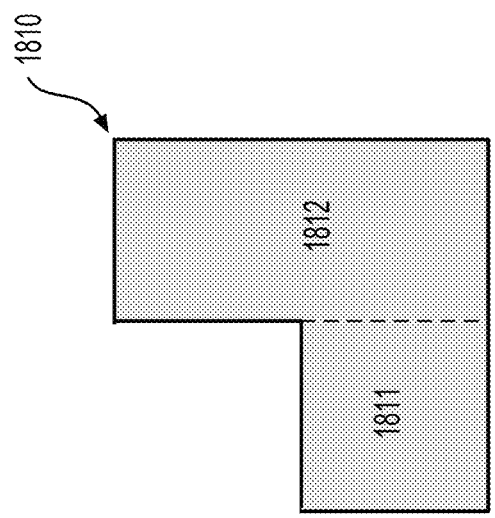
FIG. 18

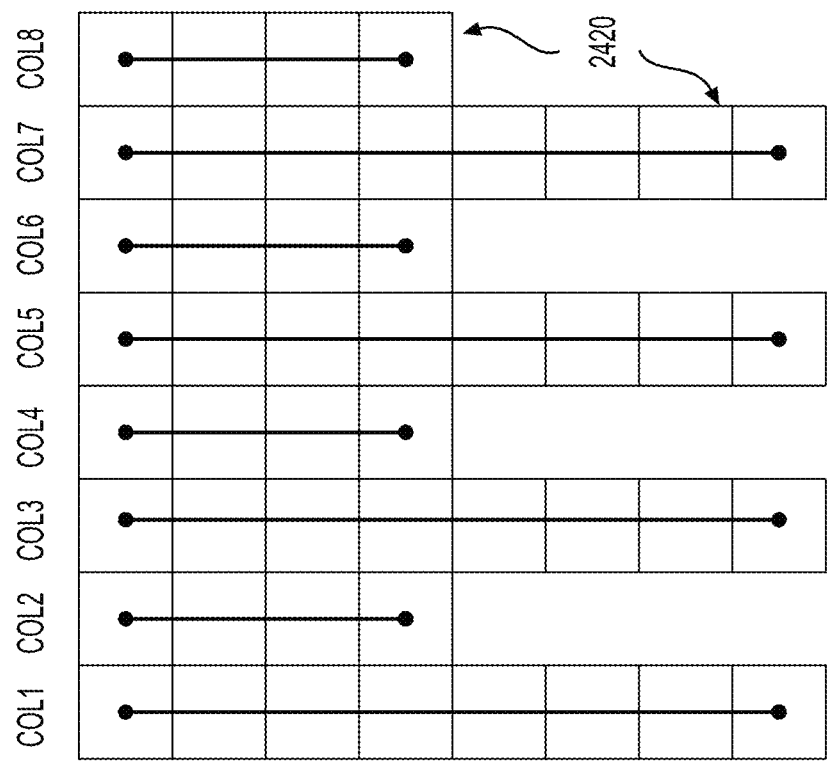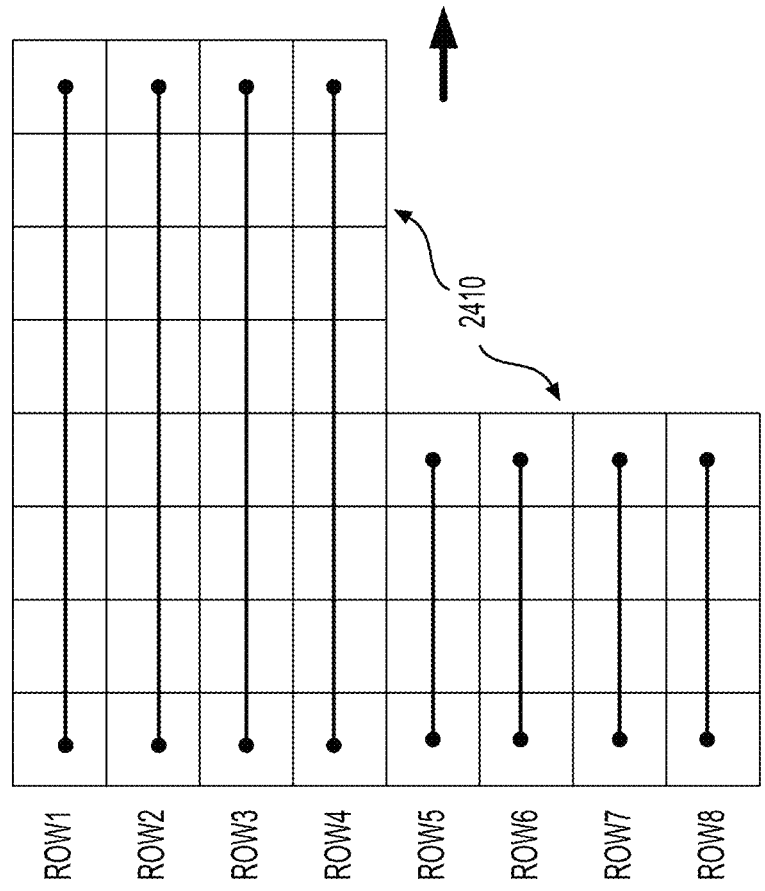
FIG. 24

TRANSFORM FOR L-SHAPED PARTITION

INCORPORATION BY REFERENCE

This present application is a continuation of U.S. application Ser. No. 17/234,507, filed on Apr. 19, 2021, which claims the benefit of priority to U.S. Provisional Application No. 63/087,042, "TRANSFORMATION SCHEME FOR L-SHAPED PARTITION" filed on Oct. 2, 2020, the entire disclosures of the prior applications are incorporated by reference.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Video coding and decoding can be performed using inter-picture prediction with motion compensation. Uncompressed digital video can include a series of pictures, each picture having a spatial dimension of, for example, 1920×1080 luminance samples and associated chrominance samples. The series of pictures can have a fixed or variable picture rate (informally also known as frame rate), of, for example 60 pictures per second or 60 Hz. Uncompressed video has significant bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GBytes of storage space.

One purpose of video coding and decoding can be the reduction of redundancy in the input video signal, through compression. Compression can help reduce the aforementioned bandwidth or storage space requirements, in some cases by two orders of magnitude or more. Both lossless and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signals is small enough to make the reconstructed signal useful for the intended application. In the case of video, lossy compression is widely employed. The amount of distortion tolerated depends on the application; for example, users of certain consumer streaming applications may tolerate higher distortion than users of television distribution applications. The compression ratio achievable can reflect that: higher allowable/tolerable distortion can yield higher compression ratios.

A video encoder and decoder can utilize techniques from several broad categories, including, for example, motion compensation, transform, quantization, and entropy coding.

Video codec technologies can include techniques known as intra coding. In intra coding, sample values are represented without reference to samples or other data from previously reconstructed reference pictures. In some video codecs, the picture is spatially subdivided into blocks of samples. When all blocks of samples are coded in intra mode, that picture can be an intra picture. Intra pictures and their derivations such as independent decoder refresh pictures, can be used to reset the decoder state and can, therefore, be used as the first picture in a coded video bitstream and a video session, or as a still image. The samples of an intra block can be exposed to a transform, and the transform coefficients can be quantized before entropy coding. Intra prediction can be a technique that minimizes sample values in the pre-transform domain. In some cases, the smaller the DC value after a transform is, and the smaller the AC coefficients are, the fewer the bits that are required at a given quantization step size to represent the block after entropy coding.

Traditional intra coding such as known from, for example MPEG-2 generation coding technologies, does not use intra prediction. However, some newer video compression technologies include techniques that attempt, from, for example, surrounding sample data and/or metadata obtained during the encoding/decoding of spatially neighboring, and preceding in decoding order, blocks of data. Such techniques are henceforth called "intra prediction" techniques. Note that in at least some cases, intra prediction is only using reference data from the current picture under reconstruction and not from reference pictures.

There can be many different forms of intra prediction. When more than one of such techniques can be used in a given video coding technology, the technique in use can be coded in an intra prediction mode. In certain cases, modes can have submodes and/or parameters, and those can be coded individually or included in the mode codeword. Which codeword to use for a given mode/submode/parameter combination can have an impact in the coding efficiency gain through intra prediction, and so can the entropy coding technology used to translate the codewords into a bitstream.

A certain mode of intra prediction was introduced with H.264, refined in H.265, and further refined in newer coding technologies such as joint exploration model (JEM), versatile video coding (VVC), and benchmark set (BMS). A predictor block can be formed using neighboring sample values belonging to already available samples. Sample values of neighboring samples are copied into the predictor block according to a direction. A reference to the direction in use can be coded in the bitstream or may itself be predicted.

SUMMARY

Aspects of the disclosure provide methods and apparatuses for video encoding/decoding. In some examples, an apparatus for video decoding includes processing circuitry. The processing circuitry decodes from a coded video bitstream, transform coefficients associated with a coding block that is a non rectangular partition of a picture. Further, the processing circuitry determines residuals of the coding block based on the transform coefficients, and reconstructs samples of the coding block based on the residuals of the coding block.

In some embodiments, the processing circuitry determines first residuals of a first rectangular sub-block based on first transform coefficients in the transform coefficients. The first rectangular sub-block is a first partition of the non rectangular partition. Further, the processing circuitry determines second residuals of a second rectangular sub-block based on second transform coefficients in the transform coefficients. In an example, the second rectangular sub-block is a second partition of the non rectangular partition and has a same size as the first rectangular sub-block. In another example, the second rectangular sub-block is a second partition of the non rectangular partition and has a different size from the first rectangular sub-block.

In some embodiments, the processing circuitry determines intermediate transform coefficients of an intermediate transform unit by performing inverse transform of a transform unit in a first direction. The transform unit is formed by the transform coefficients. Further, the processing circuitry determines the residuals of the coding block by performing inverse transform of the intermediate transform unit in a second direction.

In some examples, the processing circuitry performs, first inverse transform operations respectively on first columns of the transform unit. The first inverse transform operations respectively are a first number of points inverse transform. Further, the processing circuitry performs, second inverse transform operations respectively on second columns of the transform unit. The second inverse transform operations respectively are a second number of points inverse transform. The processing circuitry performs, third inverse transform operations respectively on first rows of the intermediate transform unit. The third inverse transform operations respectively are a third number of points inverse transform. Further, the processing circuitry performs, fourth inverse transform operations respectively on second rows of the intermediate transform unit. The fourth inverse transform operations respectively are a fourth number of points inverse transform.

In some other examples, the processing circuitry performs, first inverse transform operations respectively on first rows of the transform unit. The first inverse transform operations respectively are a first number of points inverse transform. The processing circuitry performs, second inverse transform operations respectively on second rows of the transform unit. The second inverse transform operations respectively are a second number of points inverse transform. Further, the processing circuitry performs, third inverse transform operations respectively on first columns of the intermediate transform unit. The third inverse transform operations respectively are a third number of points inverse transform. Then, the processing circuitry performs, fourth inverse transform operations respectively on second columns of the intermediate transform unit. The fourth inverse transform operations respectively are a fourth number of points inverse transform.

According to an aspect of the disclosure, the processing circuit can determine the residuals of the coding block by performing an inverse Karhunen-Loeve transform (KLT) of the transform coefficients.

According to another aspect of the disclosure, the processing circuit determines first residuals of a rectangular unit that includes the non rectangular partition by performing 2-dimensional inverse transform of the transform coefficients, and selects the residuals of the coding block from the first residuals of the rectangular block.

In some embodiments, the processing circuit forms a transform unit for the non rectangular partition by following a scan order for a rectangular unit that encompasses the non rectangular partition and skipping scan positions that are out of the non rectangular partition.

Aspects of the disclosure also provide a non-transitory computer-readable medium storing instructions which when executed by a computer for video decoding cause the computer to perform the method for video decoding.

BRIEF DESCRIPTION OF THE DRAWINGS

Further features, the nature, and various advantages of the disclosed subject matter will be more apparent from the following detailed description and the accompanying drawings in which:

FIG. 14 shows examples of transform partitioning for intra coded blocks.

FIG. 18 shows two examples of transform partitioning for L-shaped partition according to some embodiments of the disclosure.

FIG. 24 shows an example of an application of 2-dimensional transform in the order of a horizontal transform and a vertical transform.

DETAILED DESCRIPTION OF EMBODIMENTS

Figure 1:
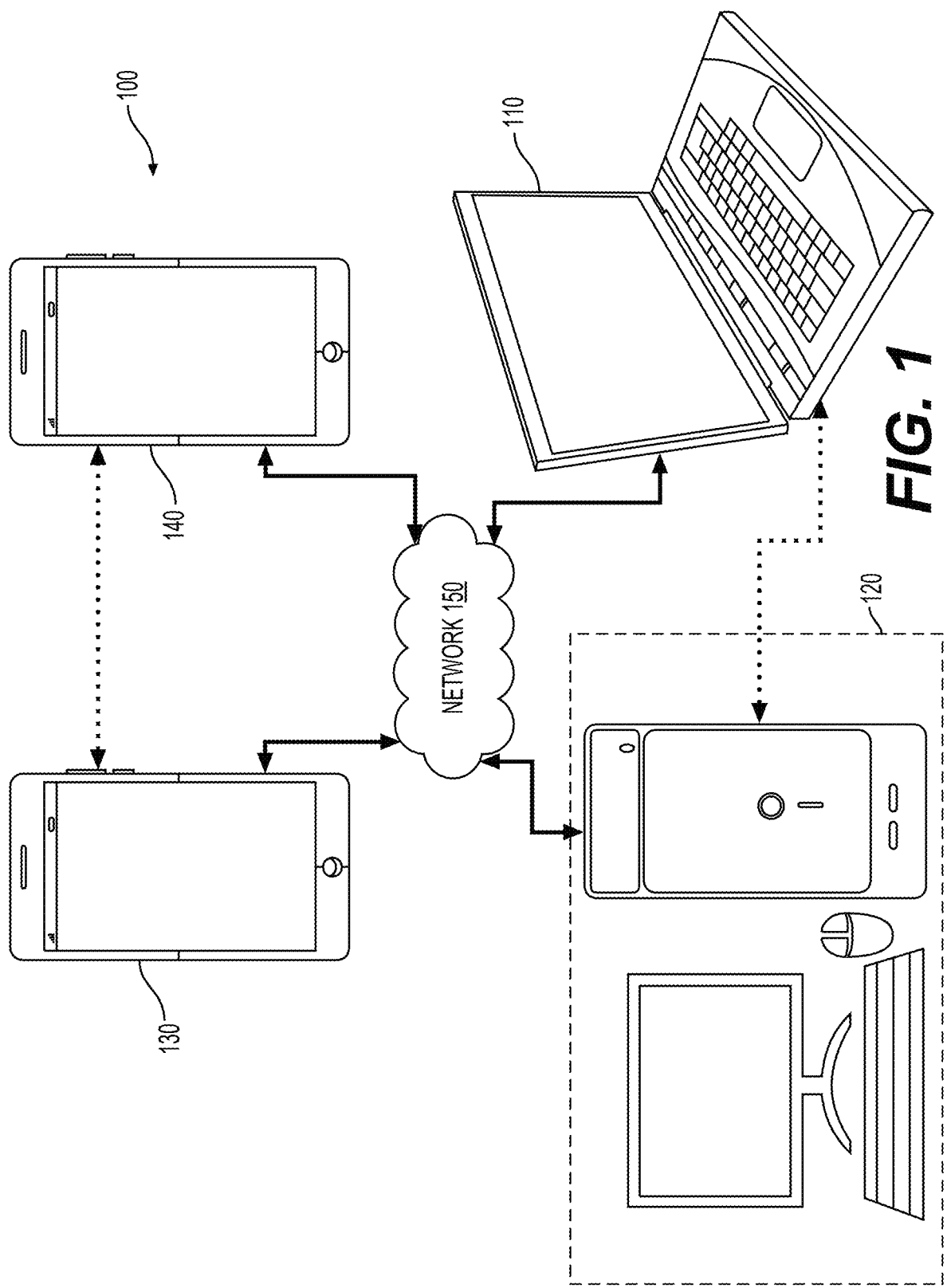
FIG. 1 is a schematic illustration of a simplified block diagram of a communication system (100) in accordance with an embodiment.

FIG. 1 illustrates a simplified block diagram of a communication system (100) according to an embodiment of the present disclosure. The communication system (100) includes a plurality of terminal devices that can communicate with each other, via, for example, a network (150). For example, the communication system (100) includes a first pair of terminal devices (110) and (120) interconnected via the network (150). In the FIG. 1 example, the first pair of terminal devices (110) and (120) performs unidirectional transmission of data. For example, the terminal device (110) may code video data (e.g., a stream of video pictures that are captured by the terminal device (110)) for transmission to the other terminal device (120) via the network (150). The encoded video data can be transmitted in the form of one or more coded video bitstreams. The terminal device (120) may receive the coded video data from the network (150), decode the coded video data to recover the video pictures and display video pictures according to the recovered video data. Unidirectional data transmission may be common in media serving applications and the like.

In another example, the communication system (100) includes a second pair of terminal devices (130) and (140) that performs bidirectional transmission of coded video data that may occur, for example, during videoconferencing. For bidirectional transmission of data, in an example, each terminal device of the terminal devices (130) and (140) may code video data (e.g., a stream of video pictures that are captured by the terminal device) for transmission to the other terminal device of the terminal devices (130) and (140) via the network (150). Each terminal device of the terminal devices (130) and (140) also may receive the coded video data transmitted by the other terminal device of the terminal devices (130) and (140), and may decode the coded video data to recover the video pictures and may display video pictures at an accessible display device according to the recovered video data.

In the FIG. 1 example, the terminal devices (110), (120), (130) and (140) may be illustrated as servers, personal computers and smart phones but the principles of the present disclosure may be not so limited. Embodiments of the present disclosure find application with laptop computers, tablet computers, media players and/or dedicated video conferencing equipment. The network (150) represents any number of networks that convey coded video data among the terminal devices (110), (120), (130) and (140), including for example wireline (wired) and/or wireless communication networks. The communication network (150) may exchange data in circuit-switched and/or packet-switched channels. Representative networks include telecommunications networks, local area networks, wide area networks and/or the Internet. For the purposes of the present discussion, the architecture and topology of the network (150) may be immaterial to the operation of the present disclosure unless explained herein below.

Figure 2:
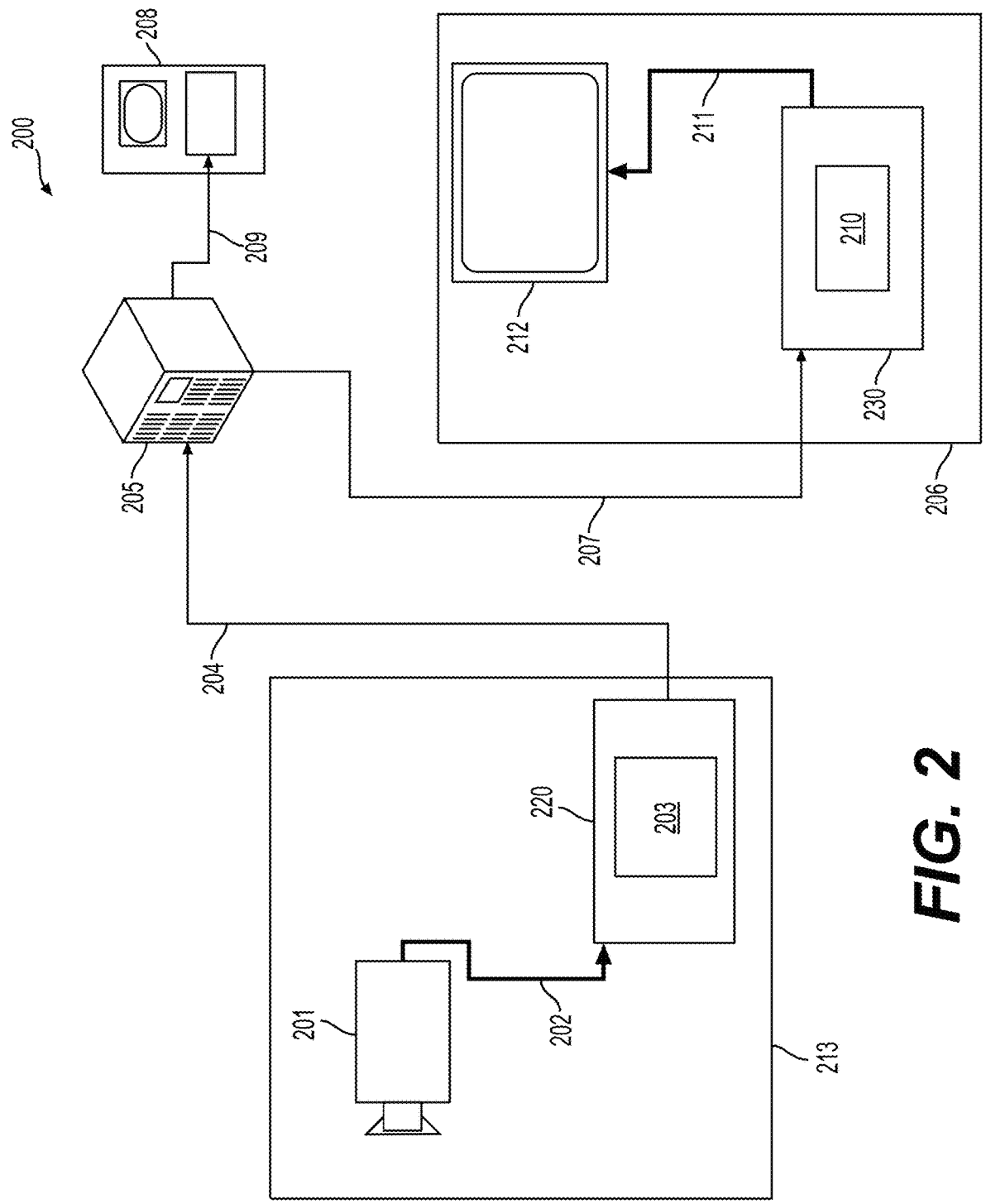
FIG. 2 is a schematic illustration of a simplified block diagram of a communication system (200) in accordance with an embodiment.

FIG. 2 illustrates, as an example for an application for the disclosed subject matter, the placement of a video encoder and a video decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (213), that can include a video source (201), for example a digital camera, creating for example a stream of video pictures (202) that are uncompressed. In an example, the stream of video pictures (202) includes samples that are taken by the digital camera. The stream of video pictures (202), depicted as a bold line to emphasize a high data volume when compared to encoded video data (204) (or coded video bitstreams), can be processed by an electronic device (220) that includes a video encoder (203) coupled to the video source (201). The video encoder (203) can include hardware, software, or a combination thereof to enable or implement aspects of the disclosed subject matter as described in more detail below. The encoded video data (204) (or encoded video bitstream (204)), depicted as a thin line to emphasize the lower data volume when compared to the stream of video pictures (202), can be stored on a streaming server (205) for future use. One or more streaming client subsystems, such as client subsystems (206) and (208) in FIG. 2 can access the streaming server (205) to retrieve copies (207) and (209) of the encoded video data (204). A client subsystem (206) can include a video decoder (210), for example, in an electronic device (230). The video decoder (210) decodes the incoming copy (207) of the encoded video data and creates an outgoing stream of video pictures (211) that can be rendered on a display (212) (e.g., display screen) or other rendering device (not depicted). In some streaming systems, the encoded video data (204), (207), and (209) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (220) and (230) can include other components (not shown). For example, the electronic device (220) can include a video decoder (not shown) and the electronic device (230) can include a video encoder (not shown) as well.

Figure 3:
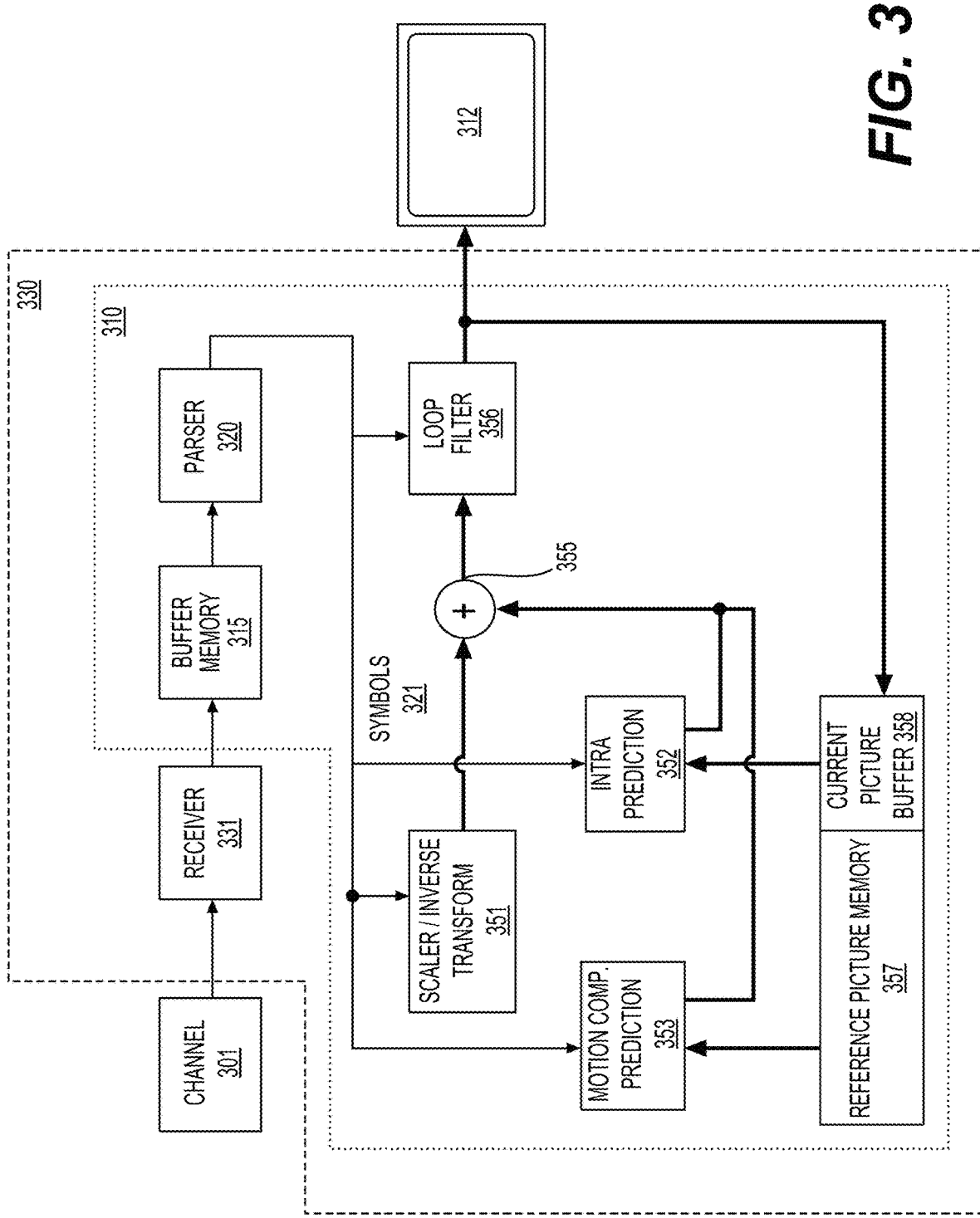
FIG. 3 is a schematic illustration of a simplified block diagram of a decoder in accordance with an embodiment.

FIG. 3 shows a block diagram of a video decoder (310) according to an embodiment of the present disclosure. The video decoder (310) can be included in an electronic device (330). The electronic device (330) can include a receiver (331) (e.g., receiving circuitry). The video decoder (310) can be used in the place of the video decoder (210) in the FIG. 2 example.

The receiver (331) may receive one or more coded video sequences to be decoded by the video decoder (310); in the same or another embodiment, one coded video sequence at a time, where the decoding of each coded video sequence is independent from other coded video sequences. The coded video sequence may be received from a channel (301), which may be a hardware/software link to a storage device which stores the encoded video data. The receiver (331) may receive the encoded video data with other data, for example, coded audio data and/or ancillary data streams, that may be forwarded to their respective using entities (not depicted). The receiver (331) may separate the coded video sequence from the other data. To combat network jitter, a buffer memory (315) may be coupled in between the receiver (331) and an entropy decoder/parser (320) ("parser (320)" henceforth). In certain applications, the buffer memory (315) is part of the video decoder (310). In others, it can be outside of the video decoder (310) (not depicted). In still others, there can be a buffer memory (not depicted) outside of the video decoder (310), for example to combat network jitter, and in addition another buffer memory (315) inside the video decoder (310), for example to handle playout timing. When the receiver (331) is receiving data from a store/forward device of sufficient bandwidth and controllability, or from an isosynchronous network, the buffer memory (315) may not be needed, or can be small. For use on best effort packet networks such as the Internet, the buffer memory (315) may be required, can be comparatively large and can be advantageously of adaptive size, and may at least partially be implemented in an operating system or similar elements (not depicted) outside of the video decoder (310).

The video decoder (310) may include the parser (320) to reconstruct symbols (321) from the coded video sequence. Categories of those symbols include information used to manage operation of the video decoder (310), and potentially information to control a rendering device such as a render device (312) (e.g., a display screen) that is not an integral part of the electronic device (330) but can be coupled to the electronic device (330), as was shown in FIG. 3. The control information for the rendering device(s) may be in the form of Supplemental Enhancement Information (SEI messages) or Video Usability Information (VUI) parameter set fragments (not depicted). The parser (320) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (320) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (320) may also extract from the coded video sequence information such as transform coefficients, quantizer parameter values, motion vectors, and so forth.

The parser (320) may perform an entropy decoding/parsing operation on the video sequence received from the buffer memory (315), so as to create symbols (321).

Reconstruction of the symbols (321) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (320). The flow of such subgroup control information between the parser (320) and the multiple units below is not depicted for clarity.

Beyond the functional blocks already mentioned, the video decoder (310) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (351). The scaler/inverse transform unit (351) receives a quantized transform coefficient as well as control information, including which transform to use, block size, quantization factor, quantization scaling matrices, etc. as symbol(s) (321) from the parser (320). The scaler/inverse transform unit (351) can output blocks comprising sample values, that can be input into aggregator (355).

In some cases, the output samples of the scaler/inverse transform (351) can pertain to an intra coded block; that is: a block that is not using predictive information from previously reconstructed pictures, but can use predictive information from previously reconstructed parts of the current picture. Such predictive information can be provided by an intra picture prediction unit (352). In some cases, the intra picture prediction unit (352) generates a block of the same size and shape of the block under reconstruction, using surrounding already reconstructed information fetched from the current picture buffer (358). The current picture buffer (358) buffers, for example, partly reconstructed current picture and/or fully reconstructed current picture. The aggregator (355), in some cases, adds, on a per sample basis, the prediction information the intra prediction unit (352) has generated to the output sample information as provided by the scaler/inverse transform unit (351).

In other cases, the output samples of the scaler/inverse transform unit (351) can pertain to an inter coded, and potentially motion compensated block. In such a case, a motion compensation prediction unit (353) can access reference picture memory (357) to fetch samples used for prediction. After motion compensating the fetched samples in accordance with the symbols (321) pertaining to the block, these samples can be added by the aggregator (355) to the output of the scaler/inverse transform unit (351) (in this case called the residual samples or residual signal) so as to generate output sample information. The addresses within the reference picture memory (357) from where the motion compensation prediction unit (353) fetches prediction samples can be controlled by motion vectors, available to the motion compensation prediction unit (353) in the form of symbols (321) that can have, for example X, Y, and reference picture components. Motion compensation also can include interpolation of sample values as fetched from the reference picture memory (357) when sub-sample exact motion vectors are in use, motion vector prediction mechanisms, and so forth.

The output samples of the aggregator (355) can be subject to various loop filtering techniques in the loop filter unit (356). Video compression technologies can include in-loop filter technologies that are controlled by parameters included in the coded video sequence (also referred to as coded video bitstream) and made available to the loop filter unit (356) as symbols (321) from the parser (320), but can also be responsive to meta-information obtained during the decoding of previous (in decoding order) parts of the coded picture or coded video sequence, as well as responsive to previously reconstructed and loop-filtered sample values.

The output of the loop filter unit (356) can be a sample stream that can be output to the render device (312) as well as stored in the reference picture memory (357) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (320)), the current picture buffer (358) can become a part of the reference picture memory (357), and a fresh current picture buffer can be reallocated before commencing the reconstruction of the following coded picture.

The video decoder (310) may perform decoding operations according to a predetermined video compression technology in a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (331) may receive additional (redundant) data with the encoded video. The additional data may be included as part of the coded video sequence(s). The additional data may be used by the video decoder (310) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 4:
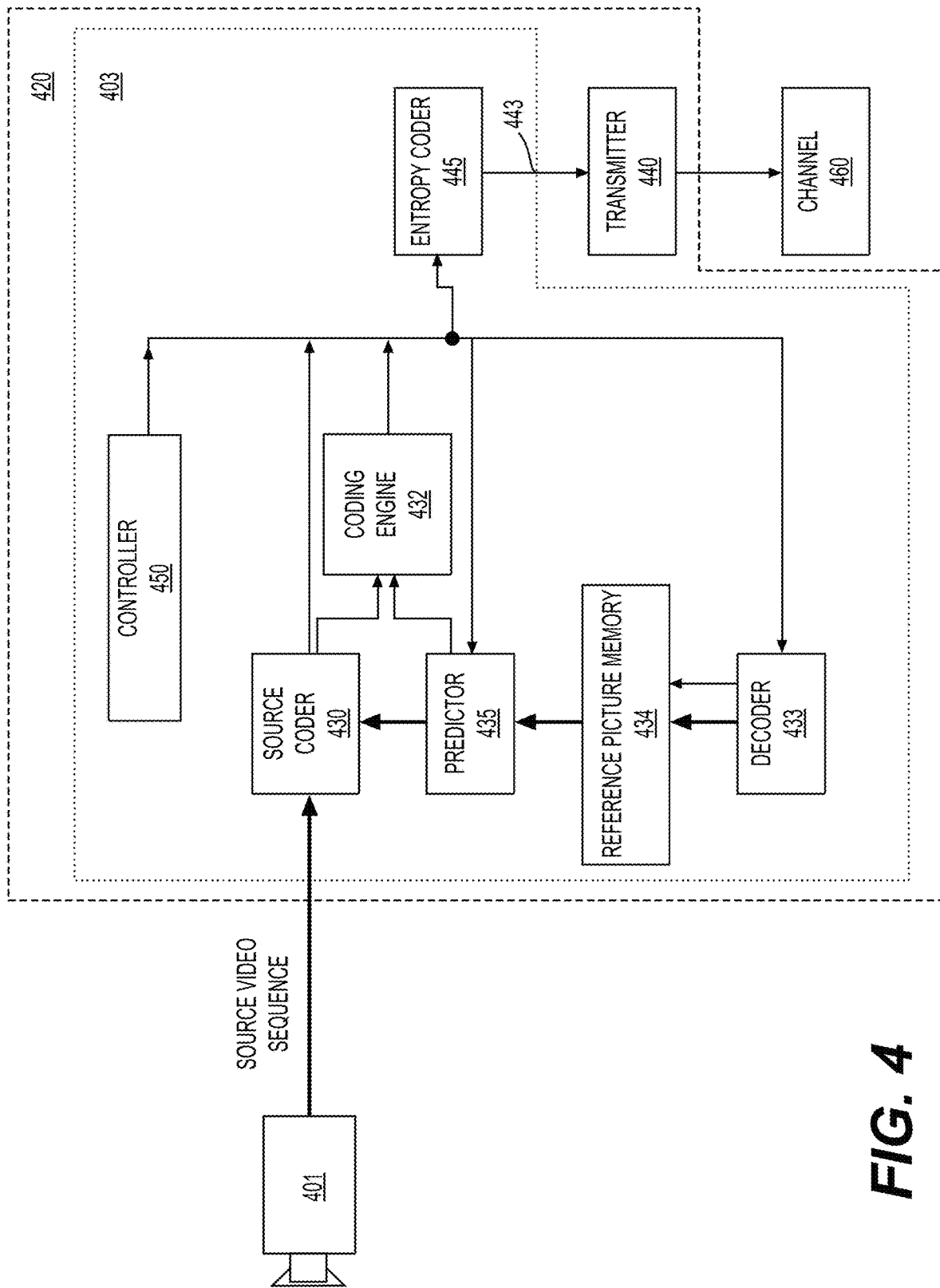
FIG. 4 is a schematic illustration of a simplified block diagram of an encoder in accordance with an embodiment.

FIG. 4 shows a block diagram of a video encoder (403) according to an embodiment of the present disclosure. The video encoder (403) is included in an electronic device (420). The electronic device (420) includes a transmitter (440) (e.g., transmitting circuitry). The video encoder (403) can be used in the place of the video encoder (203) in the FIG. 2 example.

The video encoder (403) may receive video samples from a video source (401) (that is not part of the electronic device (420) in the FIG. 4 example) that may capture video image(s) to be coded by the video encoder (403). In another example, the video source (401) is a part of the electronic device (420).

The video source (401) may provide the source video sequence to be coded by the video encoder (403) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (401) may be a storage device storing previously prepared video. In a videoconferencing system, the video source (401) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the video encoder (403) may code and compress the pictures of the source video sequence into a coded video sequence (443) in real time or under any other time constraints as required by the application. Enforcing appropriate coding speed is one function of a controller (450). In some embodiments, the controller (450) controls other functional units as described below and is functionally coupled to the other functional units. The coupling is not depicted for clarity. Parameters set by the controller (450) can include rate control related parameters (picture skip, quantizer, lambda value of rate-distortion optimization techniques, . . . ), picture size, group of pictures (GOP) layout, maximum motion vector search range, and so forth. The controller (450) can be configured to have other suitable functions that pertain to the video encoder (403) optimized for a certain system design.

In some embodiments, the video encoder (403) is configured to operate in a coding loop. As an oversimplified description, in an example, the coding loop can include a source coder (430) (e.g., responsible for creating symbols, such as a symbol stream, based on an input picture to be coded, and a reference picture(s)), and a (local) decoder (433) embedded in the video encoder (403). The decoder (433) reconstructs the symbols to create the sample data in a similar manner as a (remote) decoder also would create (as any compression between symbols and coded video bitstream is lossless in the video compression technologies considered in the disclosed subject matter). The reconstructed sample stream (sample data) is input to the reference picture memory (434). As the decoding of a symbol stream leads to bit-exact results independent of decoder location (local or remote), the content in the reference picture memory (434) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (433) can be the same as of a "remote" decoder, such as the video decoder (310), which has already been described in detail above in conjunction with FIG. 3. Briefly referring also to FIG. 3, however, as symbols are available and encoding/decoding of symbols to a coded video sequence by an entropy coder (445) and the parser (320) can be lossless, the entropy decoding parts of the video decoder (310), including the buffer memory (315), and parser (320) may not be fully implemented in the local decoder (433).

An observation that can be made at this point is that any decoder technology except the parsing/entropy decoding that is present in a decoder also necessarily needs to be present, in substantially identical functional form, in a corresponding encoder. For this reason, the disclosed subject matter focuses on decoder operation. The description of encoder technologies can be abbreviated as they are the inverse of the comprehensively described decoder technologies. Only in certain areas a more detail description is required and provided below.

During operation, in some examples, the source coder (430) may perform motion compensated predictive coding, which codes an input picture predictively with reference to one or more previously coded picture from the video sequence that were designated as "reference pictures." In this manner, the coding engine (432) codes differences between pixel blocks of an input picture and pixel blocks of reference picture(s) that may be selected as prediction reference(s) to the input picture.

The local video decoder (433) may decode coded video data of pictures that may be designated as reference pictures, based on symbols created by the source coder (430). Operations of the coding engine (432) may advantageously be lossy processes. When the coded video data may be decoded at a video decoder (not shown in FIG. 4), the reconstructed video sequence typically may be a replica of the source video sequence with some errors. The local video decoder (433) replicates decoding processes that may be performed by the video decoder on reference pictures and may cause reconstructed reference pictures to be stored in the reference picture cache (434). In this manner, the video encoder (403) may store copies of reconstructed reference pictures locally that have common content as the reconstructed reference pictures that will be obtained by a far-end video decoder (absent transmission errors).

The predictor (435) may perform prediction searches for the coding engine (432). That is, for a new picture to be coded, the predictor (435) may search the reference picture memory (434) for sample data (as candidate reference pixel blocks) or certain metadata such as reference picture motion vectors, block shapes, and so on, that may serve as an appropriate prediction reference for the new pictures. The predictor (435) may operate on a sample block-by-pixel block basis to find appropriate prediction references. In some cases, as determined by search results obtained by the predictor (435), an input picture may have prediction references drawn from multiple reference pictures stored in the reference picture memory (434).

The controller (450) may manage coding operations of the source coder (430), including, for example, setting of parameters and subgroup parameters used for encoding the video data.

Output of all aforementioned functional units may be subjected to entropy coding in the entropy coder (445). The entropy coder (445) translates the symbols as generated by the various functional units into a coded video sequence, by losslessly compressing the symbols according to technologies such as Huffman coding, variable length coding, arithmetic coding, and so forth.

The transmitter (440) may buffer the coded video sequence(s) as created by the entropy coder (445) to prepare for transmission via a communication channel (460), which may be a hardware/software link to a storage device which would store the encoded video data. The transmitter (440) may merge coded video data from the video coder (403) with other data to be transmitted, for example, coded audio data and/or ancillary data streams (sources not shown).

The controller (450) may manage operation of the video encoder (403). During coding, the controller (450) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (403) may perform coding operations according to a predetermined video coding technology or standard, such as ITU-T Rec. H.265. In its operation, the video encoder (403) may perform various compression operations, including predictive coding operations that exploit temporal and spatial redundancies in the input video sequence. The coded video data, therefore, may conform to a syntax specified by the video coding technology or standard being used.

In an embodiment, the transmitter (440) may transmit additional data with the encoded video. The source coder (430) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

Figure 5:
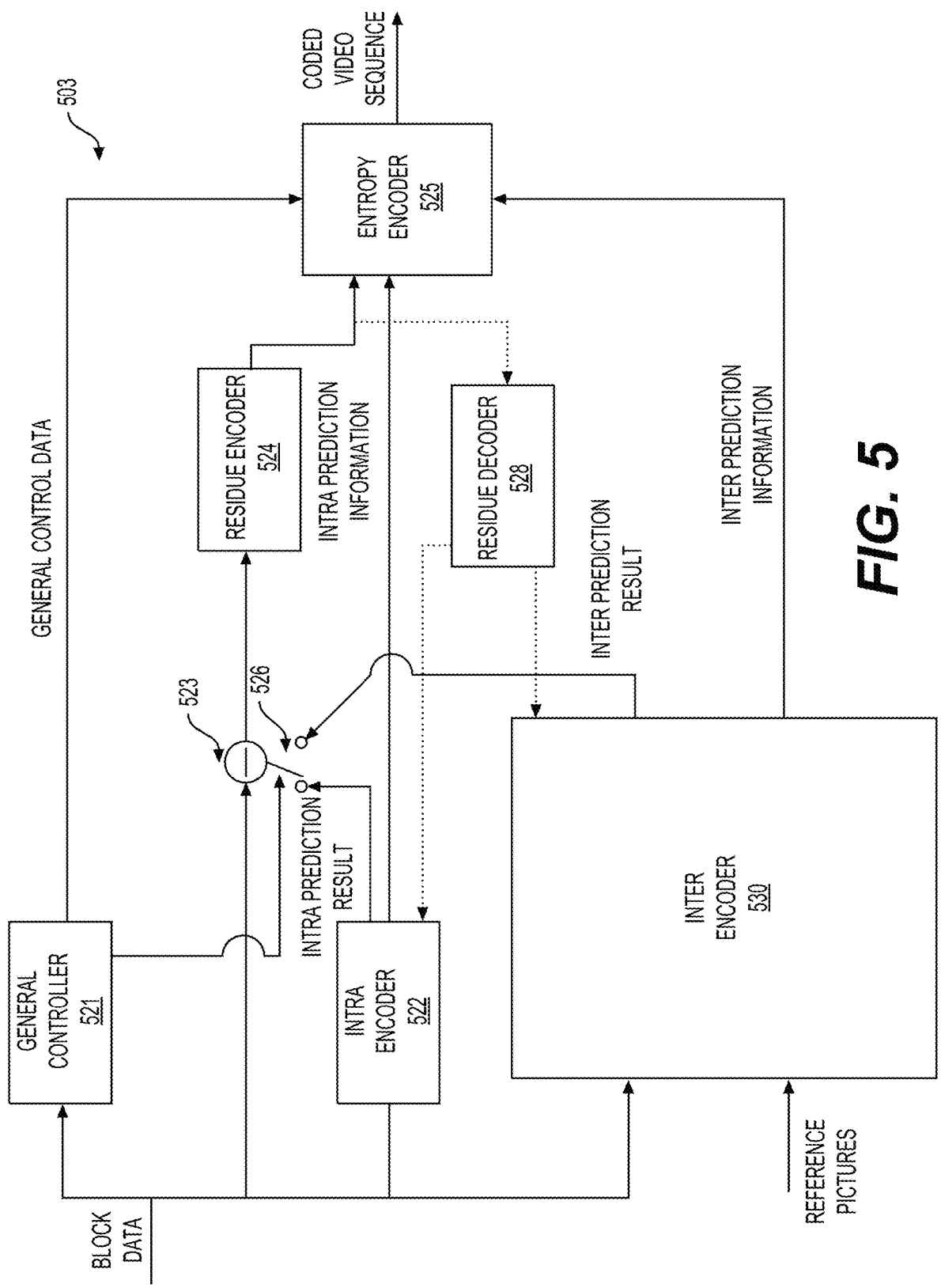
FIG. 5 shows a block diagram of an encoder in accordance with another embodiment.

FIG. 5 shows a diagram of a video encoder (503) according to another embodiment of the disclosure. The video encoder (503) is configured to receive a processing block (e.g., a prediction block) of sample values within a current video picture in a sequence of video pictures, and encode the processing block into a coded picture that is part of a coded video sequence. In an example, the video encoder (503) is used in the place of the video encoder (203) in the FIG. 2 example.

In an HEVC example, the video encoder (503) receives a matrix of sample values for a processing block, such as a prediction block of 8×8 samples, and the like. The video encoder (503) determines whether the processing block is best coded using intra mode, inter mode, or bi-prediction mode using, for example, rate-distortion optimization. When the processing block is to be coded in intra mode, the video encoder (503) may use an intra prediction technique to encode the processing block into the coded picture; and when the processing block is to be coded in inter mode or bi-prediction mode, the video encoder (503) may use an inter prediction or bi-prediction technique, respectively, to encode the processing block into the coded picture. In certain video coding technologies, merge mode can be an inter picture prediction submode where the motion vector is derived from one or more motion vector predictors without the benefit of a coded motion vector component outside the predictors. In certain other video coding technologies, a motion vector component applicable to the subject block may be present. In an example, the video encoder (503) includes other components, such as a mode decision module (not shown) to determine the mode of the processing blocks.

In the FIG. 5 example, the video encoder (503) includes the inter encoder (530), an intra encoder (522), a residue calculator (523), a switch (526), a residue encoder (524), a general controller (521), and an entropy encoder (525) coupled together as shown in FIG. 5.

The inter encoder (530) is configured to receive the samples of the current block (e.g., a processing block), compare the block to one or more reference blocks in reference pictures (e.g., blocks in previous pictures and later pictures), generate inter prediction information (e.g., description of redundant information according to inter encoding technique, motion vectors, merge mode information), and calculate inter prediction results (e.g., predicted block) based on the inter prediction information using any suitable technique. In some examples, the reference pictures are decoded reference pictures that are decoded based on the encoded video information.

The intra encoder (522) is configured to receive the samples of the current block (e.g., a processing block), in some cases compare the block to blocks already coded in the same picture, generate quantized coefficients after transform, and in some cases also intra prediction information (e.g., an intra prediction direction information according to one or more intra encoding techniques). In an example, the intra encoder (522) also calculates intra prediction results (e.g., predicted block) based on the intra prediction information and reference blocks in the same picture.

The general controller (521) is configured to determine general control data and control other components of the video encoder (503) based on the general control data. In an example, the general controller (521) determines the mode of the block, and provides a control signal to the switch (526) based on the mode. For example, when the mode is the intra mode, the general controller (521) controls the switch (526) to select the intra mode result for use by the residue calculator (523), and controls the entropy encoder (525) to select the intra prediction information and include the intra prediction information in the bitstream; and when the mode is the inter mode, the general controller (521) controls the switch (526) to select the inter prediction result for use by the residue calculator (523), and controls the entropy encoder (525) to select the inter prediction information and include the inter prediction information in the bitstream.

The residue calculator (523) is configured to calculate a difference (residue data) between the received block and prediction results selected from the intra encoder (522) or the inter encoder (530). The residue encoder (524) is configured to operate based on the residue data to encode the residue data to generate the transform coefficients. In an example, the residue encoder (524) is configured to convert the residue data from a spatial domain to a frequency domain, and generate the transform coefficients. The transform coefficients are then subject to quantization processing to obtain quantized transform coefficients. In various embodiments, the video encoder (503) also includes a residue decoder (528). The residue decoder (528) is configured to perform inverse-transform, and generate the decoded residue data. The decoded residue data can be suitably used by the intra encoder (522) and the inter encoder (530). For example, the inter encoder (530) can generate decoded blocks based on the decoded residue data and inter prediction information, and the intra encoder (522) can generate decoded blocks based on the decoded residue data and the intra prediction information. The decoded blocks are suitably processed to generate decoded pictures and the decoded pictures can be buffered in a memory circuit (not shown) and used as reference pictures in some examples.

The entropy encoder (525) is configured to format the bitstream to include the encoded block. The entropy encoder (525) is configured to include various information according to a suitable standard, such as the HEVC standard. In an example, the entropy encoder (525) is configured to include the general control data, the selected prediction information (e.g., intra prediction information or inter prediction information), the residue information, and other suitable information in the bitstream. Note that, according to the disclosed subject matter, when coding a block in the merge submode of either inter mode or bi-prediction mode, there is no residue information.

Figure 6:
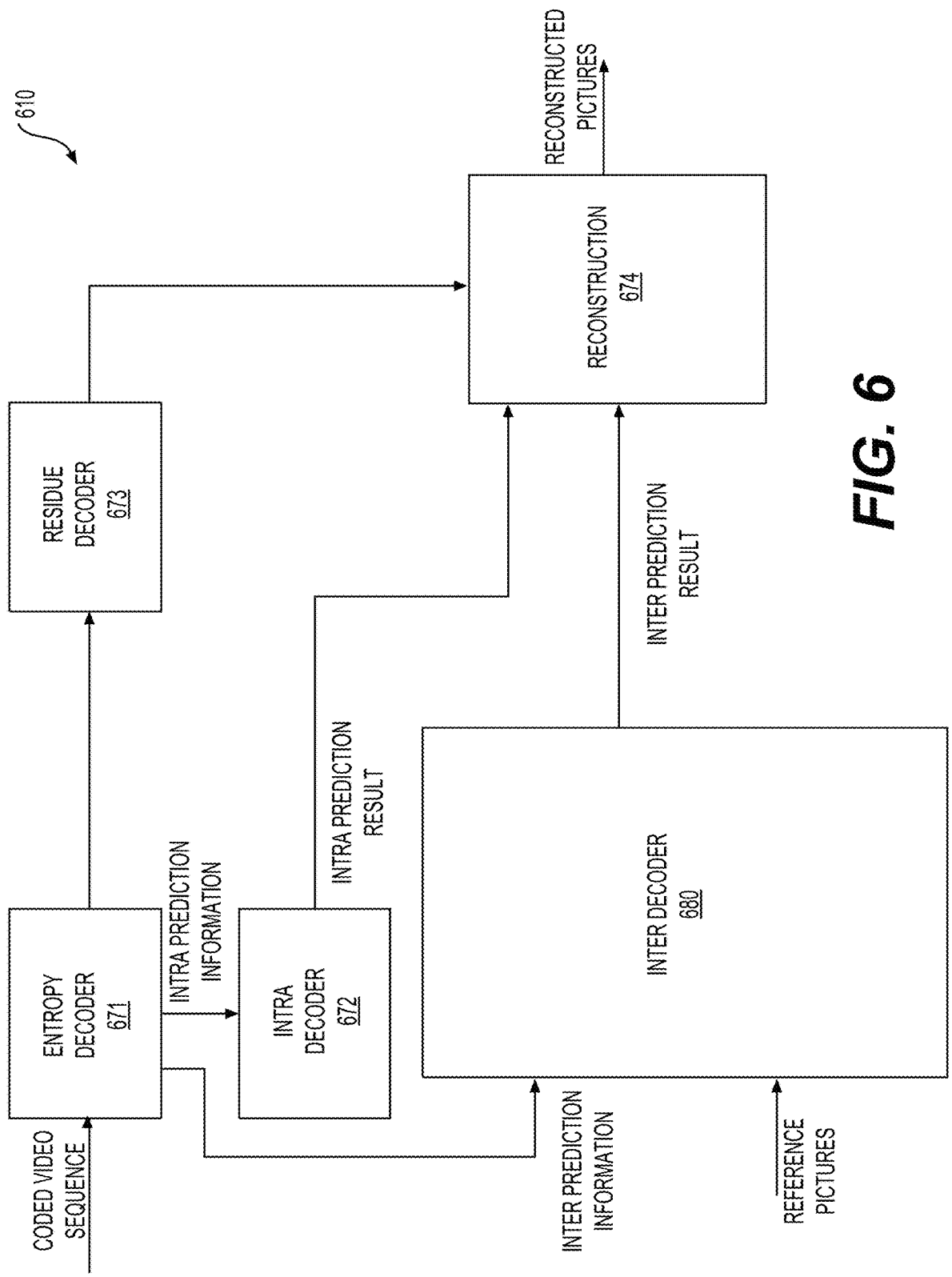
FIG. 6 shows a block diagram of a decoder in accordance with another embodiment.

FIG. 6 shows a diagram of a video decoder (610) according to another embodiment of the disclosure. The video decoder (610) is configured to receive coded pictures that are part of a coded video sequence, and decode the coded pictures to generate reconstructed pictures. In an example, the video decoder (610) is used in the place of the video decoder (210) in the FIG. 2 example.

In the FIG. 6 example, the video decoder (610) includes an entropy decoder (671), an inter decoder (680), a residue decoder (673), a reconstruction module (674), and an intra decoder (672) coupled together as shown in FIG. 6.

The entropy decoder (671) can be configured to reconstruct, from the coded picture, certain symbols that represent the syntax elements of which the coded picture is made up. Such symbols can include, for example, the mode in which a block is coded (such as, for example, intra mode, inter mode, bi-predicted mode, the latter two in merge submode or another submode), prediction information (such as, for example, intra prediction information or inter prediction information) that can identify certain sample or metadata that is used for prediction by the intra decoder (672) or the inter decoder (680), respectively, residual information in the form of, for example, quantized transform coefficients, and the like. In an example, when the prediction mode is inter or bi-predicted mode, the inter prediction information is provided to the inter decoder (680); and when the prediction type is the intra prediction type, the intra prediction information is provided to the intra decoder (672). The residual information can be subject to inverse quantization and is provided to the residue decoder (673).

The inter decoder (680) is configured to receive the inter prediction information, and generate inter prediction results based on the inter prediction information.

The intra decoder (672) is configured to receive the intra prediction information, and generate prediction results based on the intra prediction information.

The residue decoder (673) is configured to perform inverse quantization to extract de-quantized transform coefficients, and process the de-quantized transform coefficients to convert the residual from the frequency domain to the spatial domain. The residue decoder (673) may also require certain control information (to include the Quantizer Parameter (QP)), and that information may be provided by the entropy decoder (671) (data path not depicted as this may be low volume control information only).

The reconstruction module (674) is configured to combine, in the spatial domain, the residual as output by the residue decoder (673) and the prediction results (as output by the inter or intra prediction modules as the case may be) to form a reconstructed block, that may be part of the reconstructed picture, which in turn may be part of the reconstructed video. It is noted that other suitable operations, such as a deblocking operation and the like, can be performed to improve the visual quality.

It is noted that the video encoders (203), (403), and (503), and the video decoders (210), (310), and (610) can be implemented using any suitable technique. In an embodiment, the video encoders (203), (403), and (503), and the video decoders (210), (310), and (610) can be implemented using one or more integrated circuits. In another embodiment, the video encoders (203), (403), and (403), and the video decoders (210), (310), and (610) can be implemented using one or more processors that execute software instructions.

Aspects of the disclosure provide transform schemes for non-rectangular shaped partitions, such as L-shaped partitions, and the like.

Generally, a picture is partitioned into blocks, and blocks can be units for various processing, such as coding, prediction, transformation, and the like. Various block partition techniques can be used.

Figure 7:
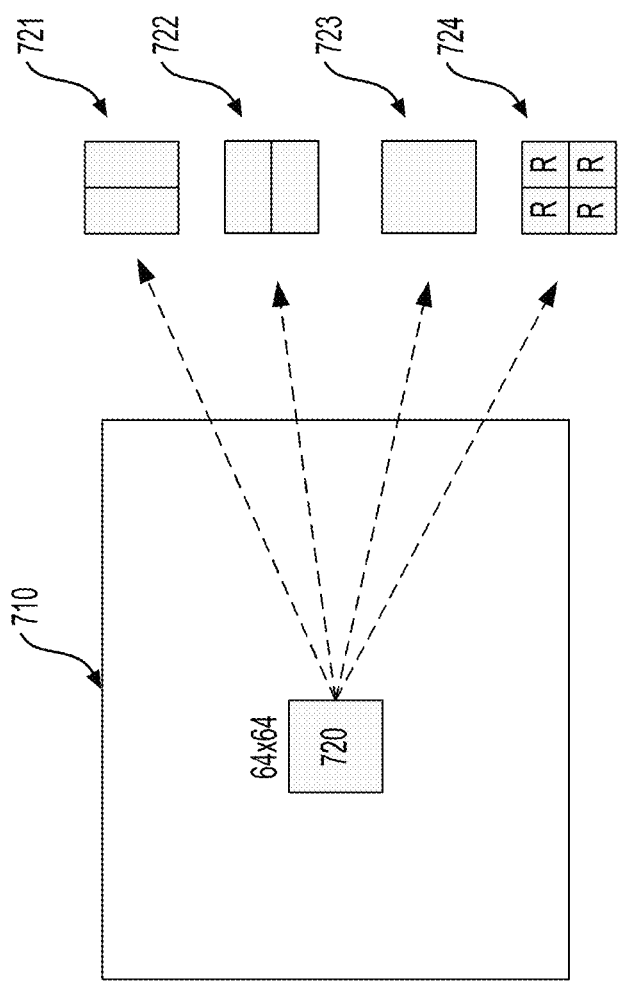
FIG. 7 shows an example of partition techniques used in a video coding format example.

FIG. 7 shows an example of partition techniques used in a video coding format VP9 by the Alliance for Open Media (AOMedia). For example, a picture (710) is partitioned into a plurality of blocks (720) of size 64×64 (e.g., 64 samples× 64 samples). Further, a 4-way partition tree can start from 64×64 level down to smaller blocks, and lowest level can be 4×4 level (e.g., block size of 4 samples×4 samples). In some examples, some additional restrictions can be applied for blocks 8×8 and below. In the FIG. 7 examples, a 64×64 block (720) can be partitioned into smaller blocks using one of a first way (721), a second way (722), a third way (723) and a fourth way (724). Please note that partitions designated as R (shown in the fourth way (724)) refer to as recursive in that the same partition tree can be repeated at a lower scale until the lowest 4×4 level.

Figure 8:
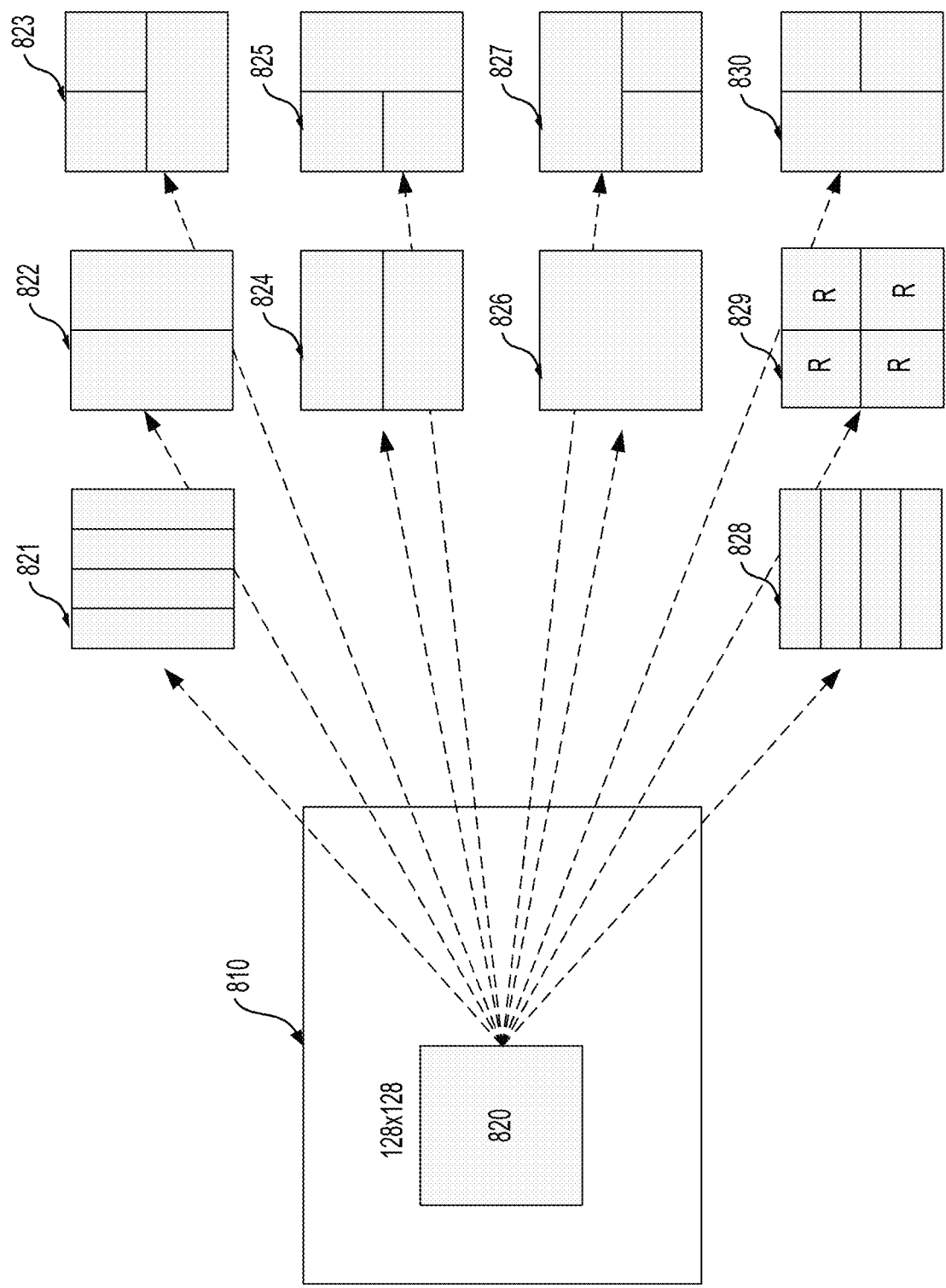
FIG. 8 shows an example of partition techniques used in another video coding format example.

FIG. 8 shows an example of partition techniques used in a video coding format AOMedia Video 1 (AV1) designed for video transmissions over the Internet. AV1 was developed as a successor to VP9. For example, a picture (810) is partitioned into a plurality of blocks (820) of size 128×128 (e.g., 128 samples×128 samples). Further, a 10-way partition structures can start from 128×128 down to smaller blocks. In the FIG. 8 example, a 128×128 block can be partitioned into smaller blocks using one of ten ways (821)-(830). AV1 not only expands the partition-tree to a 10-way structure, but also increases the largest size (referred to as superblock in VP9/AV1 parlance) to start from 128×128. It is noted that the 10-way structure includes 4:1/1:4 rectangular partitions that did not exist in VP9. In an example, none of the rectangular partitions can be further subdivided. In addition, AV1 adds more flexibility to the use of partitions below 8×8 level, in the sense that 2×2 chroma inter prediction now becomes possible on certain cases.

In some examples, the block partitioning structure is referred to as a coding tree. In an example (e.g., HEVC), the coding tree can have a quad tree structure with each split splitting a larger square block into four smaller square blocks. In some examples, a picture is split into coding tree units (CTUs), and then a CTU is split into smaller blocks using the quad tree structure. According to the quad tree structure, a coding tree unit (CTU) is split into coding units (CUs) to adapt to various local characteristics. A decision on whether to code a picture area using an inter-picture (temporal) or intra-picture (spatial) prediction can be made at CU level. Each CU can be further split into one, two, or four prediction units (PUs) according to a PU splitting type. Inside one PU, a same prediction process is applied and relevant information is transmitted to a decoder on a PU basis.

After obtaining a residual block by applying a prediction process based on the PU splitting type, a CU can be partitioned into transform units (TUs) according to another quad tree structure. In the example of HEVC, there are multiple partition conceptions including CU, PU, and TU. In some embodiments, a CU or a TU can only be square shape, while a PU may be square or rectangular shape. In some embodiments, one coding block may be further split into four square sub-blocks, and transform is performed on each sub-block, i.e., TU. Each TU can be further split recursively into smaller TUs using a quad tree structure which is called residual quad tree (RQT).

At a picture boundary, in some examples (e.g., HEVC), implicit quad tree split can be employed so that a block will keep quad tree splitting until the size fits the picture boundary.

In some examples (e.g., VVC), a block partitioning structure can use quad tree plus binary tree (QTBT) block partitioning structure. The QTBT structure can remove the concepts of multiple partition types (the CU, PU and TU concepts), and supports more flexibility for CU partition shapes. In the QTBT block partitioning structure, a CU can have either a square or rectangular shape.

Figure 9B:
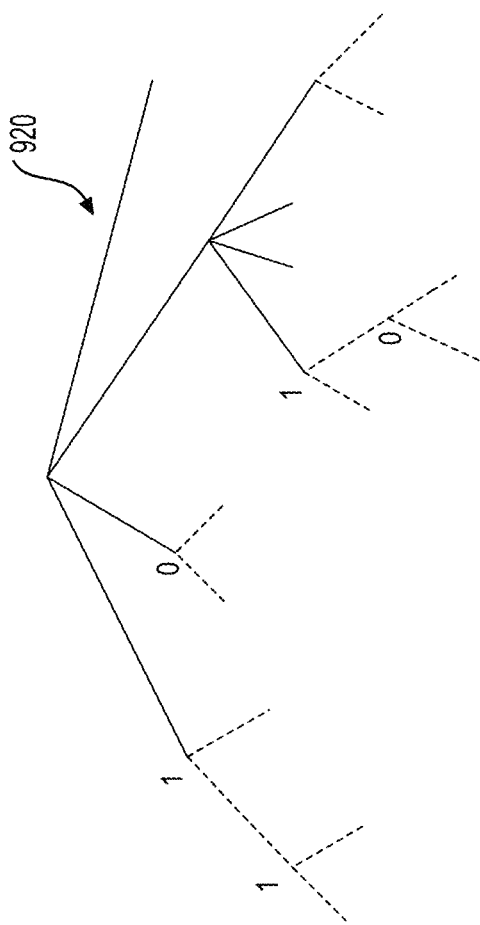
FIGS. 9A and 9B show an example of partition techniques used in another video coding format example.
Figure 9A:
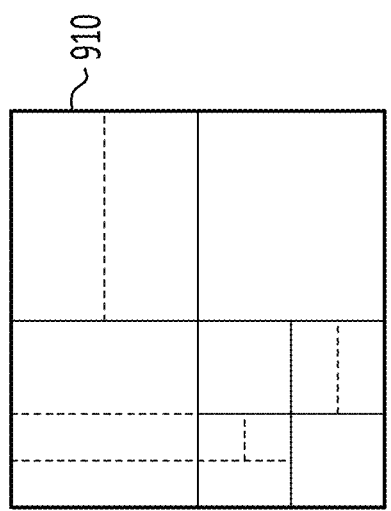

FIG. 9A shows a CTU (910) that is partitioned by using a QTBT block partitioning structure (920) shown in FIG. 9B. The CTU (910) is first partitioned by a quad tree structure. The quad tree leaf nodes are further partitioned by a binary tree structure or a quad tree structure. There can be two splitting types, symmetric horizontal splitting (e.g., labeled as "0" in the QTBT block partitioning structure (920)) and symmetric vertical splitting (e.g., labeled as "1" in the QTBT block partitioning structure (920)), in the binary tree splitting. The leaf nodes without further splitting are called CUs that can be used for prediction and transform processing without any further partitioning. Accordingly, CU, PU and TU have the same block size in the QTBT block partitioning structure.

In some examples (e.g., JEM), a CU can include coding blocks (CBs) of different color components. For example, one CU contains one luma CB and two chroma CBs in the case of P and B slices of the 4:2:0 chroma format. A CU can include a CB of a single color component. For example, one CU contains only one luma CB or just two chroma CBs in the case of I slices.

The following parameters are defined for the QTBT block partitioning scheme in some embodiments:
 CTU size: the root node size of a quad tree, e.g. the same concept as in HEVC.
 MinQTSize: the minimum allowed quad tree leaf node size.
 MaxBTSize: the maximum allowed binary tree root node size.
 MaxBTDepth: the maximum allowed binary tree depth.
 MinBTSize: the minimum allowed binary tree leaf node size.

In one example of the QTBT block partitioning structure, the CTU size is set as 128×128 luma samples with two corresponding 64×64 blocks of chroma samples, the MinQTSize is set as 16×16, the MaxBTSize is set as 64×64, the MinBTSize (for both width and height) is set as 4×4, and the MaxBTDepth is set as 4. The quad tree partitioning is applied to the CTU first to generate quad tree leaf nodes. The quad tree leaf nodes may have a size from 16×16 (i.e., the MinQTSize) to 128×128 (i.e., the CTU size). If the leaf quad tree node is 128×128, the leaf quad tree node will not be further split by the binary tree since the size exceeds the MaxBTSize (i.e., 64×64). Otherwise, the leaf quad tree node could be further partitioned by the binary tree. Therefore, the quad tree leaf node is also the root node for the binary tree and it has the binary tree depth as 0.

When the binary tree depth reaches MaxBTDepth (i.e., 4), no further splitting is considered. When the binary tree node has width equal to MinBTSize (i.e., 4), no further horizontal splitting is considered. Similarly, when the binary tree node has height equal to MinBTSize, no further vertical splitting is considered. The leaf nodes of the binary tree are further processed by prediction and transform processing without any further partitioning. In an embodiment, a maximum CTU size is 256×256 luma samples.

In FIGS. 9A and 9B, the solid lines indicate quad tree splitting and dotted lines indicate binary tree splitting. In each splitting (i.e., non-leaf) node of the binary tree, one flag is signaled to indicate which splitting type (i.e., horizontal or vertical) is used. For example, 0 indicates a horizontal splitting and 1 indicates a vertical splitting. For the quad tree splitting, there is no need to indicate the splitting type since quad tree splitting can split a block both horizontally and vertically to produce 4 sub-blocks with an equal size.

In some embodiments, the QTBT block partitioning scheme supports the flexibility for the luma and chroma to have separate QTBT block partitioning structures. For example, for P and B slices, the luma and chroma blocks in one CTU share the same QTBT block partitioning structure. However, for I slices, the luma CTB is partitioned into CUs by a QTBT block partitioning structure, and the chroma blocks are partitioned into chroma CUs by another QTBT block partitioning structure. Thus, a CU in an I slice consists of a coding block of the luma component or coding blocks of two chroma components, and a CU in a P or B slice consists of coding blocks of all three color components.

In some examples (e.g., HEVC), inter prediction for small blocks is restricted to reduce memory access of motion compensation. For example, bi-prediction is not supported for 4×8 and 8×4 blocks, and inter prediction is not supported for 4×4 blocks.

Further, in some examples (e.g., VCC), a multi-type tree (MTT) block partitioning structure is used. The MTT block partitioning structure is a more flexible tree structure than the QTBT block partitioning structure. In MTT, in addition to quad tree partitioning and binary tree partitioning, horizontal center-side triple tree partitioning and vertical center-side triple tree partitioning can be used.

Figure 10B:
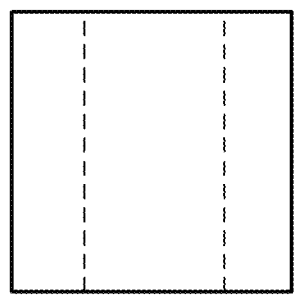
FIGS. 10A and 10B show examples of vertical center-side triple tree partitioning and horizontal center-side triple tree partitioning.
Figure 10A:
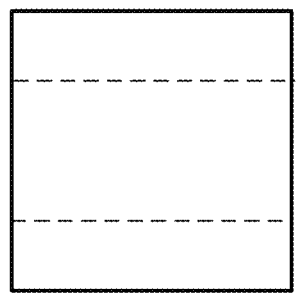

FIG. 10A shows an example of vertical center-side triple tree partitioning and FIG. 10B shows an example of horizontal center-side triple tree partitioning. Triple tree partitioning can complement quad-tree and binary-tree partitioning. For example, triple-tree partitioning is able to capture objects which locate in a block center, while quad-tree and binary-tree splits crossing block centers. The width and height of partitions by triple trees are a power of 2 so that no additional transform partition is needed.

The design of block partitioning is mainly motivated by complexity reduction. Theoretically, the complexity of traversing of a tree is TD, where T denotes the number of split types, and D is the depth of tree.

According to some aspects of the disclosure, non-rectangular shaped partitions, such as L-shaped partitions, and the like can be used in block partitioning. For example, a coding unit or a coding block can have an L shape.

Figure 11:
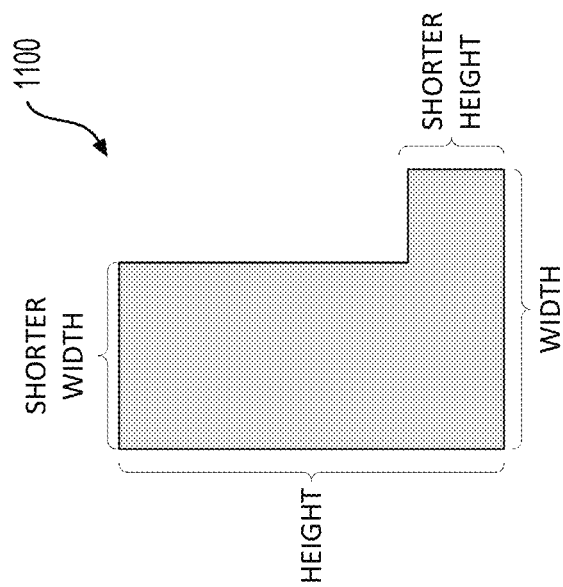
FIG. 11 shows an L-shaped block that is one of partitions from block partitioning.

FIG. 11 shows an L-shaped block (1100) that is one of partitions from block partitioning. For example, instead of using rectangular block partitions, an L-type partitioning can split a block into one or more L-shaped partitions and one or more rectangular partitions. As shown in FIG. 11, an L-shaped (or L-Type) partition can be defined by four parameters that are referred to as a width, a shorter width, a height and a shorter height. The L-shaped partition (1100) can be suitably rotated or flipped.

Figure 12:
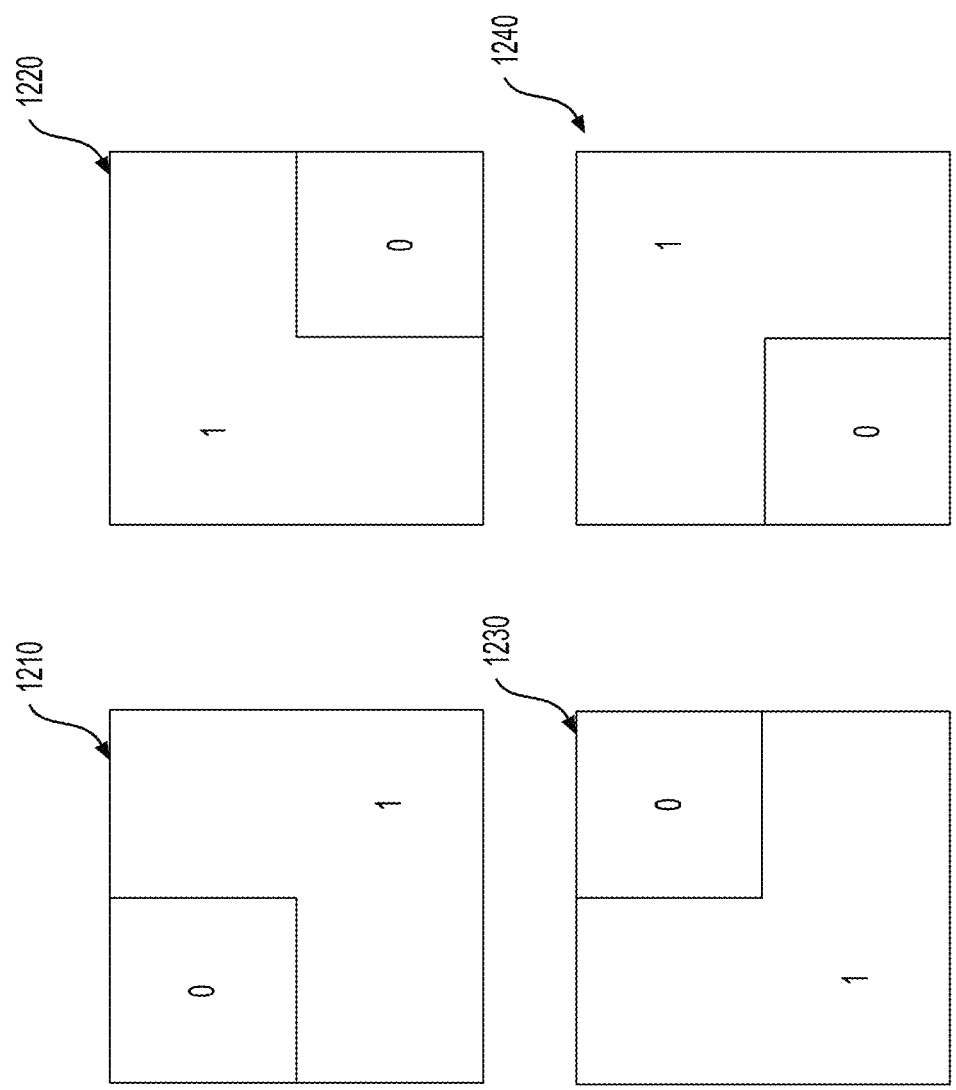
FIG. 12 shows examples of L-type partitioning tree according to some embodiments of the disclosure.

FIG. 12 shows examples (1210), (1220), (1230) and (1240) of L-type partitioning tree according to some embodiments of the disclosure. In the examples of (1210), (1220), (1230) and (1240), a rectangular block can be partitioned into two partitions, including one L-shaped partition (shown by "1") and one rectangular partition (shown by "0").

In some examples (e.g., AV1), transform block partitioning can be performed to generate transform blocks. For both intra and inter coded blocks, the coding block can be further partitioned into multiple transform units with the partitioning depth being up to 2 levels (two depths). In an example, 1-1 size mapping is used from a current depth to a next depth.

Figure 13:
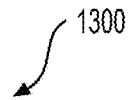
FIG. 13 shows a table of size mapping from the transform size of the current depth to the transform size of the next depth.

FIG. 13 shows a table of size mapping from the transform size of the current depth to the transform size of the next depth. It is noted that the number in the table refers to the number of samples. For example, the last row indicates that when the transform unit size of the current depth is 64 samples by 16 samples and the transform unit is further partitioned, then the transform unit size of the next depth is 32 samples by 16 samples.

In some examples, intra coded blocks and inter coded blocks can use different transform partition techniques.

FIG. 14 shows examples of transform partitioning for intra coded blocks. For intra coded blocks, the transform partitioning is done in a way that all the transform blocks have the same size, and the transform blocks are coded in a raster scan order. For example, an intra coded block (1410) can be partitioned (e.g., using a quad tree partition) into four transform blocks of the same size, as shown by (1420). In another example, an intra coded block (1410) can be partitioned (e.g., using quad tree partitions in two depths) into 16 blocks of the same size, as shown by (1430). The transform blocks can be coded in a raster scan order that is shown by arrow lines in FIG. 14.

For inter coded blocks, the transform unit partitioning can be done in a recursive manner with the partitioning depth up to 2 levels (2 depths). The transform partitioning in the inter coded blocks can support different shapes, such as 1:1 (square), 1:2/2:1, and 1:4/4:1 transform unit sizes ranging from 4×4 to 64×64. In an example, when the coding block is smaller than or equal to 64×64, the transform block partitioning can only apply to luma component; and then for chroma blocks, the transform block size is identical to the coding block size. Otherwise, when the coding block width or height is greater than 64, then both the luma and chroma coding blocks can be implicitly split into multiples of min(W, 64)×min(H, 64) and min(W, 32)×min(H, 32) transform blocks, respectively.

Figure 15:
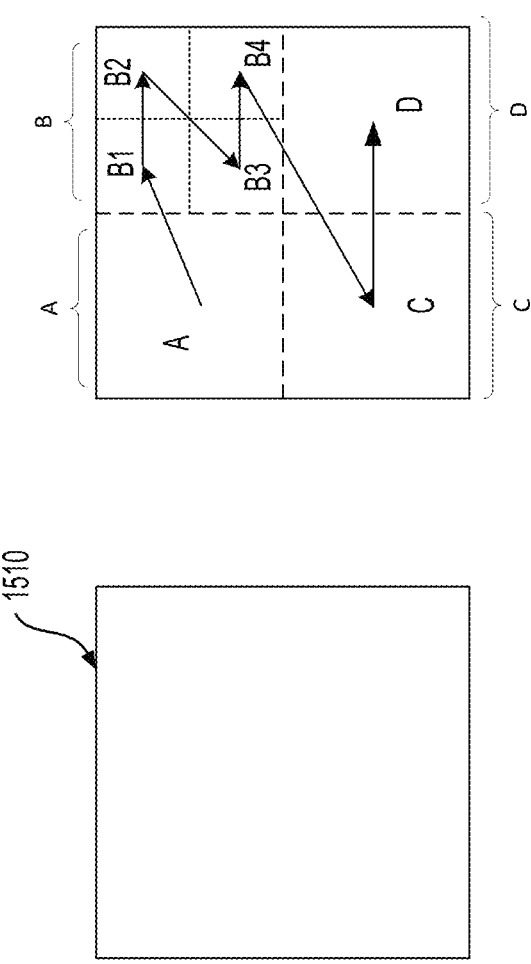
FIG. 15 shows an example of transform partitioning for inter coded blocks.

FIG. 15 shows an example of transform partitioning for inter coded blocks. For example, at a first transform partition depth, an intra coded block (1510) is partitioned (e.g., using quad tree partition) into four transform blocks A, B, C and D of the same size. Then, at a second transform partition depth, the transform block B is partitioned (e.g., using quad tree partition) into four transform blocks, B1, B2, B3 and B4. The transform blocks can be coded in a raster scan order, such as in an order of A, B1, B2, B3, B4, C and D, as shown by arrow lines in FIG. 15.

It is noted that when a coding block is an L-shaped partition, and after prediction, the residuals can have an L shape and the residual block can be referred to as L-shaped residual block. In the following description of transform scheme, the L-shaped partition may be used to define geometric attribute of a processing unit, and the processing unit can be any one of a residual block, a transform coefficient block, an intermediate transform coefficient block, and the like. Aspects of the present disclosure provide transform schemes, for non-rectangular shaped residual blocks, such as L-shaped residual blocks and the like.

It is also noted that, in the following description, while transform schemes are illustrated on L-shaped partition, the transform schemes can be suitably used on other non-rectangular block, According to an aspect of the disclosure, for an L-shaped partition (e.g., L-shaped coding block), transform can be applied to a whole L-shaped residual block. In some embodiments, a separable 2-dimensional transform can be applied to a whole L-shaped residual block. In some embodiments, a non-separable transform can be applied to a whole L-shaped residual block. In some embodiments, the L-shaped residual block is suitably adjusted to form a rectangular residual block, and the transform can be applied to the rectangular residual block.

According to another aspect of the disclosure, an L-shaped partition (e.g., L-shaped residual block, L-shaped transform coefficient block) can be further split into multiple transform units, such as multiple rectangular shaped transform units. Then, transform can be respectively performed on the transform units, such as the multiple rectangular shaped transform units.

In some embodiments, whether an L-shape partition is split or not can be signaled in the bitstream. In an example, a sequence level flag is used to indicate whether further split is allowable on L-shaped partition in a current sequence. When the sequence level flag indicates no further split is allowed for the current sequence, then transform is applied to each of whole L-shaped residual blocks in the sequence. When the sequence level flag indicates further split is allowed for the current sequence, a coding block level flag can be used to signal whether further split is applied on a current L-shaped coding block.

According to an aspect of the disclosure, an L-shape coding block can be partitioned into two or more rectangular sub-blocks, such as at least two square or non-square rectangular sub-blocks. The rectangular sub-blocks can be used as transform units. Then, transform schemes for rectangular blocks can be applied to residuals of each rectangular sub-block.

In some embodiments, an L-shape coding block can be partitioned into 3 rectangular transform units of same size. The rectangular transform units can be square or non-square rectangular. Further, each transform unit can be individually split or not split in some examples.

Figure 16:
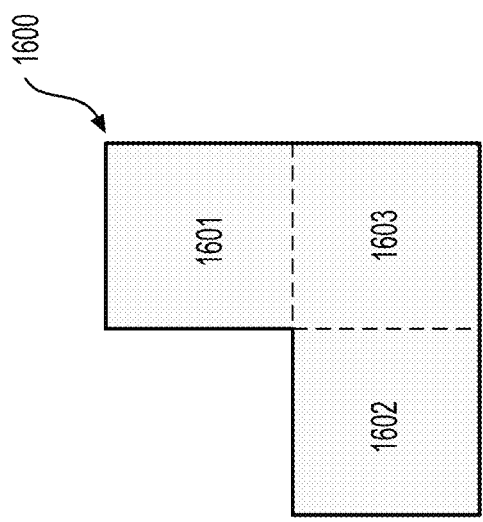
FIG. 16 shows an example of transform partitioning for an L-shaped partition according to an embodiment of the disclosure.

FIG. 16 shows an example of transform partitioning for an L-shaped partition according to an embodiment of the disclosure. In FIG. 16, an L-shaped block (1600) (e.g., coding unit) is partitioned into three rectangular blocks (1601)-(1603) (e.g., transform units). The partitions (also referred to as transform splits) are denoted by dashed lines. The three rectangular blocks (1601)-(1603) can be three transform units in an example.

In an embodiment, for an intra-coded block of the L-shaped partition, all the transform units within the L-shaped partition have the same size. Using FIG. 16 as an example, the L-shaped block (1600) is an intra-coded block, and the rectangular blocks (1601)-(1603) are of square shape and have the same size.

In another embodiment, for an inter-coded block of the L-shaped partition, the transform units can be individually further split into smaller transform units.

Figure 17:
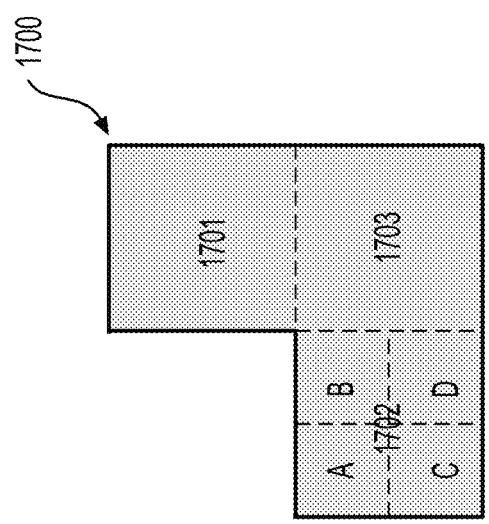
FIG. 17 shows an example of transform partitioning for an L-shaped partition according to an embodiment of the disclosure.

FIG. 17 shows an example of transform partitioning for an L-shaped partition according to an embodiment of the disclosure. In FIG. 17, an L-shaped block (1700) is partitioned into three rectangular blocks (1701)-(1703). The partitions (also referred to as transform splits) are denoted by dashed lines. Further, the rectangular blocks (1701) and (1703) are not further split, but the rectangular block (1702) is further split into four rectangular blocks A-D. Then, the blocks (1701), (1703), and A-D can be transform units in an example. The blocks (1701), (1703), and A-D can have square shape in an example.

In some embodiments, an L-shaped coding block can be partitioned into multiple transform units with different sizes and/or aspect ratios. In an example, an L-shaped coding block can be partitioned into two transform units, such as a square transform unit and a non-square rectangular transform unit. Further, each transform unit may be individually decided of further split.

FIG. 18 shows two examples of transform partitioning for L-shaped partition according to some embodiments of the disclosure. In FIG. 18, an L-shaped block (1810) is partitioned into two rectangular blocks (1811) and (1812) by a vertical split that is denoted by a dashed line. In an example, at least one of the blocks (1811) and (1812), such as (1811), has square shape. Further, in FIG. 18, an L-shaped block (1820) is partitioned into two rectangular blocks (1821) and (1822) by a horizontal split that is denoted by a dashed line. In an example, at least one of the blocks (1821) and (1822), such as (1821) has square shape.

In an embodiment, when a transform unit has square shape, the transform unit can be individually decided for further split, and no further split can be applied to non-square rectangular transform unit.

In another embodiment, both the square transform unit and non-square rectangular transform unit can be individually decided for further split.

In some embodiments, an L-shaped coding block can be partitioned into one square transform unit and one non-square rectangular transform unit only when the L-shaped coding unit is inter-coded block.

In some embodiments, an L-shaped coding block can be partitioned into 3 square or non-square rectangular transform units. The size of the 3 transform units may be the same or may be different. Further, each transform unit can be individually decided for further split.

Figure 19:
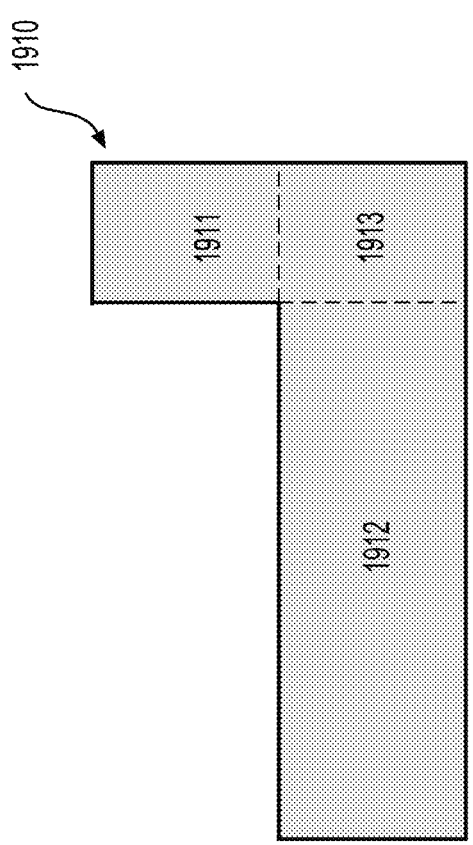
FIG. 19 shows an example of transform partitioning for L-shaped partition according to some embodiments of the disclosure.

FIG. 19 shows an example of transform partitioning for L-shaped partition according to some embodiments of the disclosure. In FIG. 19, an L-shaped block (1910) is partitioned into three rectangular blocks (1911), (1912) and (1913) by a vertical split and a horizontal split that are denoted by dashed lines.

It is noted that the residuals of an L-shaped coding block can have the same L shape as the coding block and can be referred to as an L-shaped residual block. In the following description, the L-shaped partition may be used to refer to the L-shaped residual block. Some aspects of the disclosure also provide techniques to use separable transforms, such as a separable 2-dimensional transform that includes a horizontal transform and a vertical transform, on the L-shaped residual block without further split the L-shaped residual block into rectangular blocks. When performing a separable 2-dimensional transform on an L-shaped partition, for different rows/columns of the L-shaped residual block, the transform size can be different.

In an embodiment, when doing horizontal transform for each row of the residual samples (also referred to as input samples) of an L-shaped partition, the transform size is adjusted according to the number of residual samples (input samples) in the row. For example, the transform size is the same as the number of residual samples of the respective row.

Figure 20:
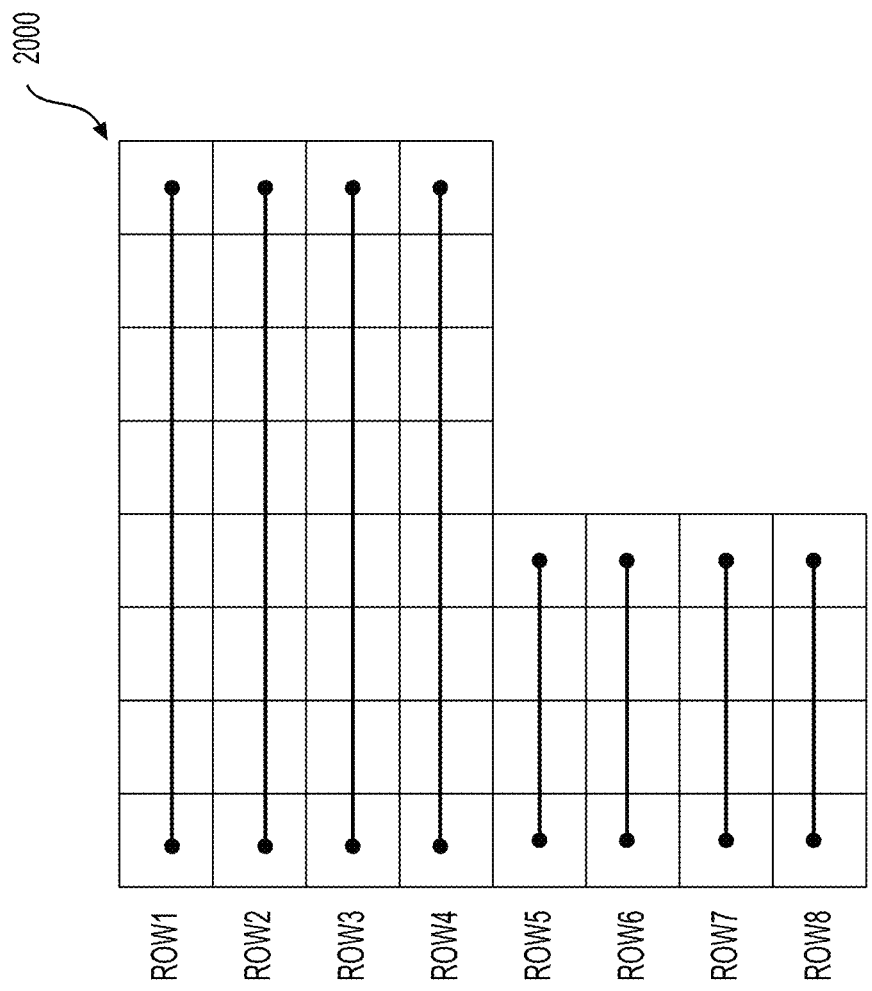
FIG. 20 shows an example of transform size adjustment according to an embodiment of the disclosure.

FIG. 20 shows an example of transform size adjustment according to an embodiment of the disclosure. In FIG. 20, an L-shape transform unit (2000) includes 8 rows that are respectively referred to as ROW1-ROW8. Each of ROW1-ROW4 includes 8 samples, and each of ROW5-ROW8 includes fours. In an example, 8-point transform can be performed on each of the first four rows ROW1-ROW4, and 4-point transform can be performed on each of the last four rows ROW5-ROW8.

In another embodiment, when doing vertical transform for each column of the residual samples (also referred to as input samples) of an L-partition, the transform size is adjusted according to the number of residual samples in the column. For example, the transform size is same as the number of residual samples of the respective column.

Figure 21:
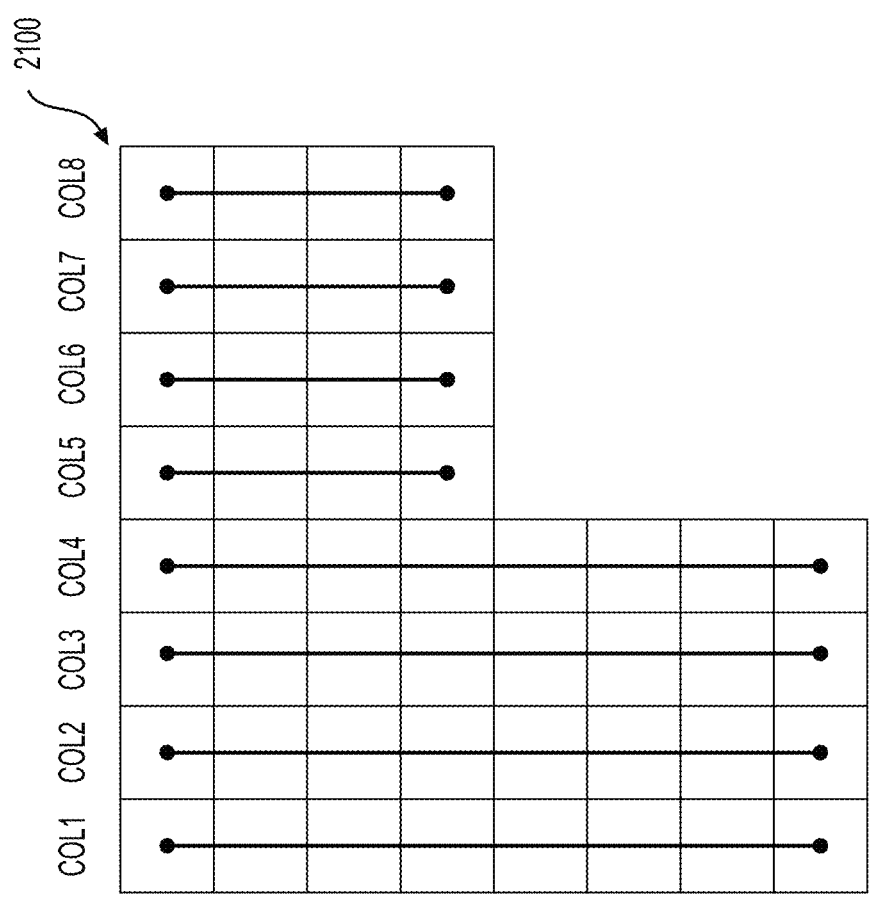
FIG. 21 shows an example of transform size adjustment according to an embodiment of the disclosure.

FIG. 21 shows an example of transform size adjustment according to an embodiment of the disclosure. In FIG. 21, an L-shape transform unit (2100) includes 8 columns that are respectively referred to as COL1-COL8. Each of COL1-COL4 includes 8 samples, and each of COL5-COL8 includes four samples. In an example, 8-point transform is performed on each of the first four columns COL1-COL4, and 4-point transform is performed on each of the last four columns COL5-COL8.

According to an aspect of the disclosure, a 2-dimensional transform for an L-shaped partition can be implemented by sequentially performing a horizontal transform and a vertical transform, such as in an order of a horizontal transform and a vertical transform or in an order of a vertical transform and horizontal transform.

In some embodiments, the 2-dimensional transform is performed in the order of a horizontal transform and a vertical transform. When the horizontal transform is applied to a residual block of the L-shape, for a row of K samples (K is a positive integer), K transform coefficients in a row are determined. It is noted that for different rows, the numbers of transform coefficients can be different. After the horizontal transform is applied, the transform coefficients of rows are suitably aligned into a transform coefficients block, and then the vertical transform can be applied to the transform coefficients block. In an embodiment, transform coefficients of the rows are aligned to the left, and the transform coefficient block has a same shape as the residual block.

Figure 22:
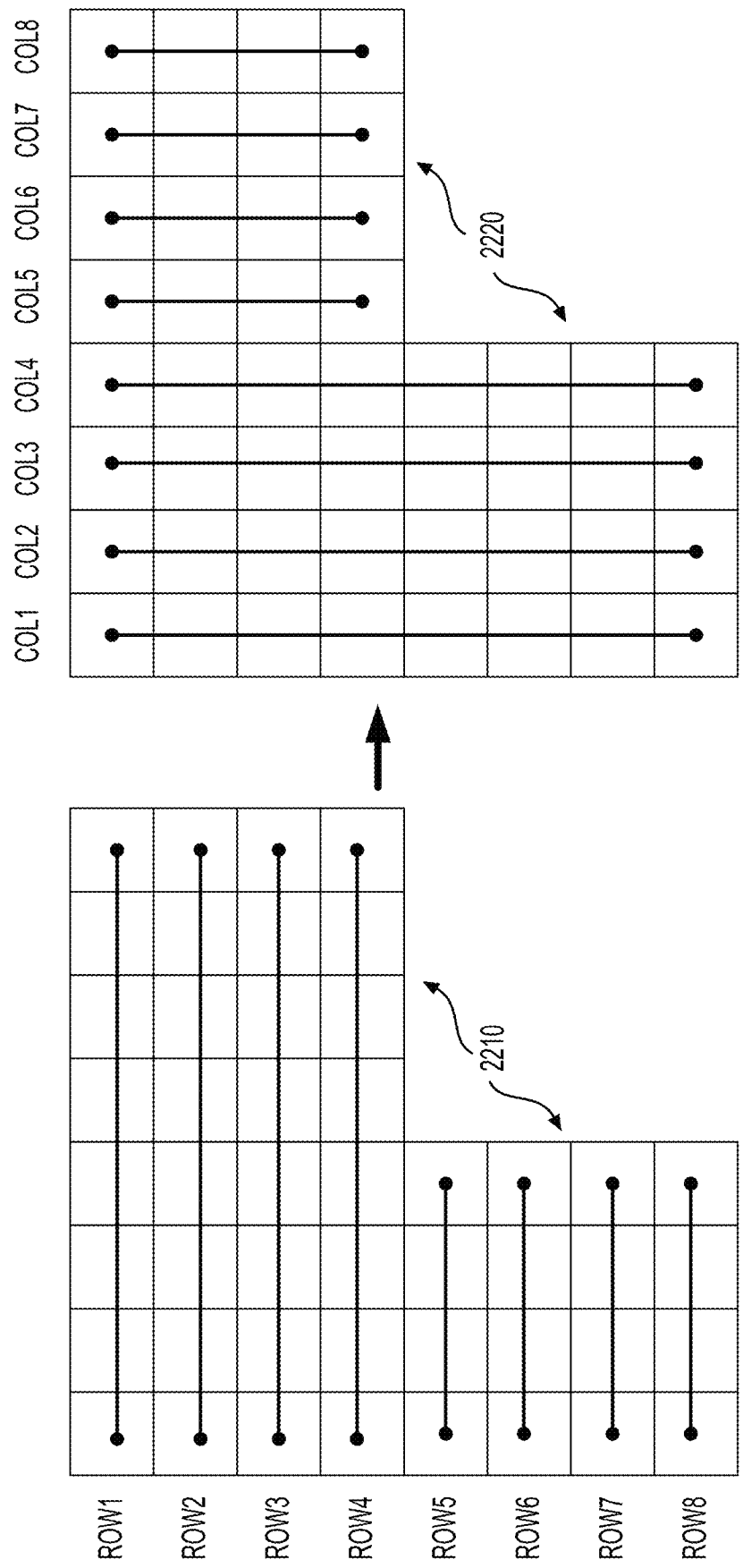
FIG. 22 shows an example of an application of 2-dimensional transform in the order of a horizontal transform and a vertical transform.

FIG. 22 shows an example of an application of 2-dimensional transform in the order of a horizontal transform and a vertical transform. In the FIG. 22 example, a horizontal transform is applied to a residual block (2210) of the L shape. Specifically, the L-shape residual block (2210) includes 8 rows that are respectively referred to as ROW1-ROW8. Each of ROW1-ROW4 includes 8 residual samples, and each of ROW5-ROW8 includes four residual samples. In an example, 8-point transform can be performed on each of the first four rows ROW1-ROW4 to determine 8 transform coefficients in each of the first four rows ROW1-ROW4; and 4-point transform can be performed on each of the last four rows ROW5-ROW8 to determine 4 transform coefficients in each of the last four rows ROW5-ROW8.

Then, the transform coefficients of ROW1-ROW8 are aligned to the left to form a transform coefficient block (2220) that is of a same L shape as the residual block (2210). Then, a vertical transform is applied to the transform coefficient block (2220) of the L shape. Specifically, the L-shape transform coefficient block (2220) includes 8 columns that are respectively referred to as COL1-COL8. Each of COL1-COL4 includes 8 transform coefficient samples, and each of COL5-COL8 includes four transform coefficient samples. In an example, 8-point transform can be performed on each of the first four columns COL1-COL4 to determine 8 final transform coefficients in each of the first four columns COL1-COL4; and 4-point transform can be performed on each of the last four columns COL5-COL8 to determine 4 final transform coefficients in each of the last four columns COL5-COL8.

In some embodiments, the 2-dimensional transform is performed in the order of a vertical transform and a horizontal transform. When the vertical transform is applied to a residual block of the L-shape, for a column of K samples (K is a positive integer), K transform coefficients in a column are determined. It is noted that for different columns, the numbers of transform coefficients of the columns can be different. After the vertical transform is applied, the transform coefficients of the columns are suitably aligned into a transform coefficients block, and then the horizontal transform can be applied to the transform coefficients block. In an embodiment, transform coefficients of the columns are aligned to the top, and the transform coefficient block has a same shape as the residual block.

Figure 23:
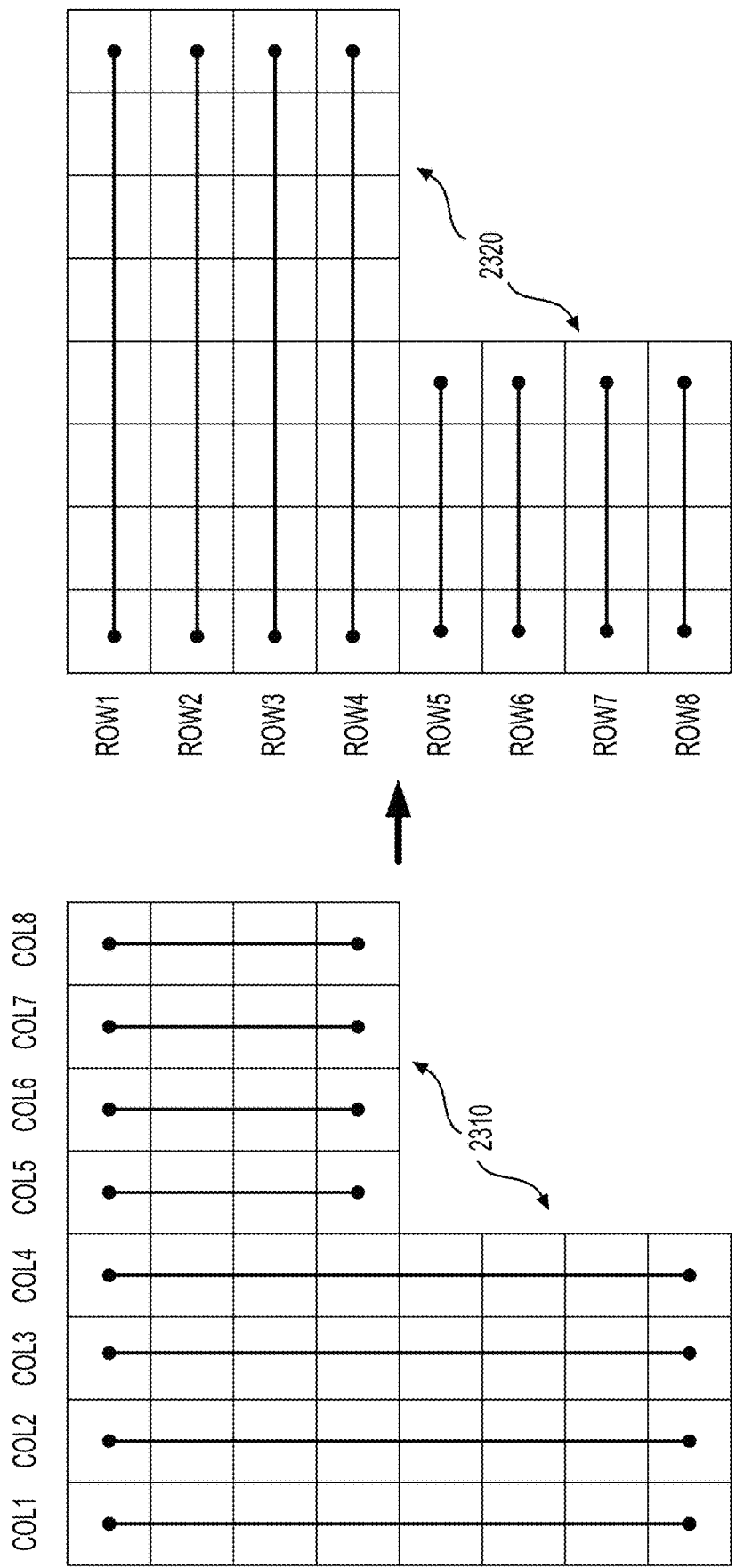
FIG. 23 shows an example of an application of 2-dimensional transform in the order of a vertical transform and a horizontal transform.

FIG. 23 shows an example of an application of 2-dimensional transform in the order of a vertical transform and a horizontal transform. In the FIG. 23 example, a vertical transform is applied to a residual block (2310) of the L shape. Specifically, the L-shape residual block (2310) includes 8 columns that are respectively referred to as COL1-COL8. Each of COL1-COL4 includes 8 residual samples, and each of COL5-COL8 includes four residual samples. In an example, 8-point transform can be performed on each of the first four columns COL1-COL4 to determine 8 transform coefficients in each of the first four columns COL1-COL4; and 4-point transform can be performed on each of the last four columns COL5-COL8 to determine 4 transform coefficients in each of the last four columns COL5-COL8.

Then, the transform coefficients of COL1-COL8 are aligned to the top to form a transform coefficient block (2320) that is of a same L shape as the residual block (2310). Then, a horizontal transform is applied to the transform coefficient block (2320) of the L shape. Specifically, the L-shape transform coefficient block (2320) includes 8 rows that are respectively referred to as ROW1-ROW8. Each of ROW1-ROW4 includes 8 transform coefficient samples, and each of ROW5-ROW8 includes four transform coefficient samples. In an example, 8-point transform can be performed on each of the first four rows ROW1-ROW4 to determine 8 final transform coefficients in each of the first four rows ROW1-ROW4; and 4-point transform can be performed on each of the last four rows ROW5-ROW8 to determine 4 final transform coefficients in each of the last four rows ROW5-ROW8.

According to an aspect of the disclosure, for the 2-dimensional transform, after the first transform, the transform coefficients can be aligned in other suitable manner to form a transform coefficient block that is of a different shape from the residual block, and the then the second transform can be applied to the transform coefficient block to determine the final transform coefficients.

In an example, the 2-dimensional transform is performed in the order of a horizontal transform and a vertical transform. When the horizontal transform is applied to a residual block of an L-shape, for a row of K samples (K is a positive integer), K transform coefficients in a row are determined. It is noted that for different rows, the numbers of transform coefficients can be different. After the horizontal transform is applied, the transform coefficients of rows are suitably aligned (e.g., based on energy profile similarity for better coding efficiency) into a transform coefficients block, and then the vertical transform can be applied to the transform coefficients block. In an example, transform coefficients of the rows with the smaller number of transform coefficients are aligned with selected positions (e.g., odd positions or even positions) of transform coefficients of the rows with the larger number of transform coefficients.

FIG. 24 shows an example of an application of 2-dimensional transform in the order of a horizontal transform and a vertical transform. In the FIG. 24 example, a horizontal transform is applied to a residual block (2410) of the L shape. Specifically, the L-shape residual block (2410) includes 8 rows that are respectively referred to as ROW1-ROW8. Each of ROW1-ROW4 includes 8 residual samples, and each of ROW5-ROW8 includes four residual samples. In an example, 8-point transform can be performed on each of the first four rows ROW1-ROW4 to determine 8 transform coefficients in each of the first four rows ROW1-ROW4; and 4-point transform can be performed on each of the last four rows ROW5-ROW8 to determine 4 transform coefficients in each of the last four rows ROW5-ROW8.

Then, the transform coefficients of ROW5-ROW8 are aligned to the odd column positions of the ROW1-ROW4 to form a transform coefficient block (2420) that is of a different shape from the residual block (2410). Then, a vertical transform is applied to the transform coefficient block (2420) of non-rectangular shape. Specifically, the transform coefficient block (2420) includes 8 columns that are respectively referred to as COL1-COL8. Each of odd columns COL1, COL3, COL5 and COL7 includes 8 transform coefficient samples, and each of even columns COL2, COL4, COL6, and COL8 includes four transform coefficient samples. In an example, 8-point transform can be performed on each of odd columns COL1, COL3, COL5 and COL7 to determine 8 final transform coefficients in each of odd columns COL1, COL3, COL5 and COL7; and 4-point transform can be performed on each of even columns COL2, COL4, COL6, and COL8 to determine 4 final transform coefficients in each of even columns COL2, COL4, COL6, and COL8.

In some embodiments, the 2-dimensional transform is performed in the order of a vertical transform and a horizontal transform. When the vertical transform is applied to a residual block of the L-shape, for a column of K samples (K is a positive integer), K transform coefficients in a column are determined. It is noted that for different columns, the numbers of transform coefficients of the columns can be different. After the vertical transform is applied, the transform coefficients of the columns are suitably aligned (e.g., based on energy) into a transform coefficients block, and then the horizontal transform can be applied to the transform coefficients block. In an example, transform coefficients of the columns with the smaller number of transform coefficients are aligned with selected positions (e.g., odd positions or even positions) of transform coefficients of the columns with the larger number of transform coefficients.

Figure 25:
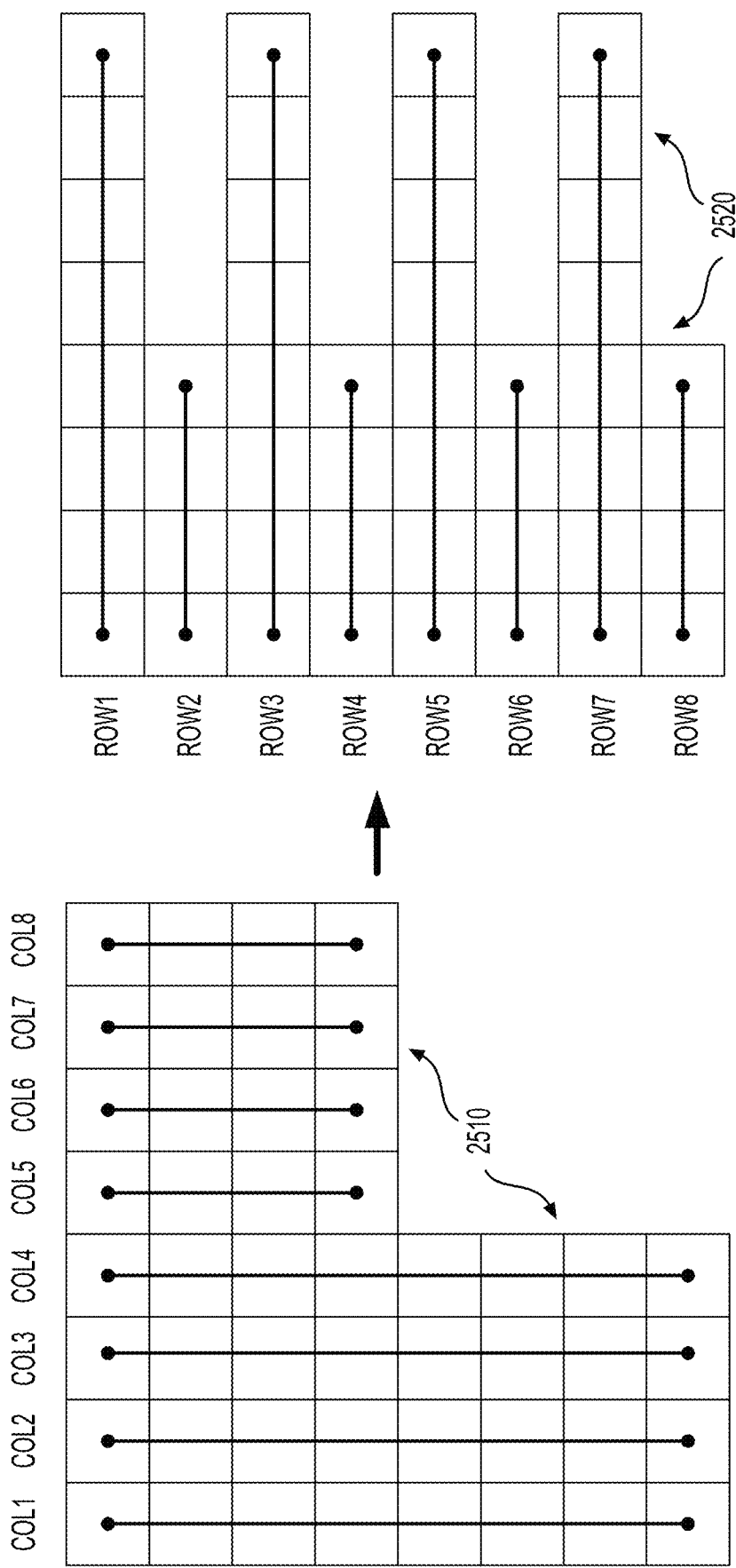
FIG. 25 shows an example of an application of 2-dimensional transform in the order of a vertical transform and a horizontal transform.

FIG. 25 shows an example of an application of 2-dimensional transform in the order of a vertical transform and a horizontal transform. In the FIG. 25 example, a vertical transform is applied to a residual block (2510) of the L shape. Specifically, the L-shape residual block (2510) includes 8 columns that are respectively referred to as COL1-COL8. Each of COL1-COL4 includes 8 residual samples, and each of COL5-COL8 includes four residual samples. In an example, 8-point transform can be performed on each of the first four columns COL1-COL4 to determine 8 transform coefficients in each of the first four columns COL1-COL4; and 4-point transform can be performed on each of the last four columns COL5-COL8 to determine 4 transform coefficients in each of the last four columns COL5-COL8.

Then, the transform coefficients of COL5-COL8 are aligned to the odd row positions of the COL1-COL4 to form a transform coefficient block (2520) that is of a different shape from the residual block (2510). Then, a horizontal transform is applied to the transform coefficient block (2520) of the L shape. Specifically, the L-shape transform coefficient block (2520) includes 8 rows that are respectively referred to as ROW1-ROW8. Each of odd rows ROW1, ROW3, ROW5 and ROW7 includes 8 transform coefficient samples, and each of even rows ROW2, ROW4, ROW6 and ROW8 includes four transform coefficient samples. In an example, 8-point transform can be performed on each of odd rows ROW1, ROW3, ROW5 and ROW7 to determine 8 final transform coefficients in each of odd rows ROW1, ROW3, ROW5 and ROW7; and 4-point transform can be performed on each of even rows ROW2, ROW4, ROW6 and ROW8 to determine 4 final transform coefficients in each of even rows ROW2, ROW4, ROW6 and ROW8.

In some embodiments, scan techniques of transform coefficients of a rectangular shape can be suitable adjusted for scanning the transform coefficients of a non rectangular shape during the entropy coding. For example, when performing the entropy coding of the transform coefficients of an L-partition with maximum W samples in the horizontal direction and maximum H samples in the vertical direction, a scan order of the WxH rectangular block is firstly derived. Then, along the scan order, if the scan position is pointing to a sample position outside the L-partition, the scan positon can be skipped, and the scan continues to the next scan position. The coefficients scanning process is not finished until all the samples of the L-partition have been scanned.

Figure 26:
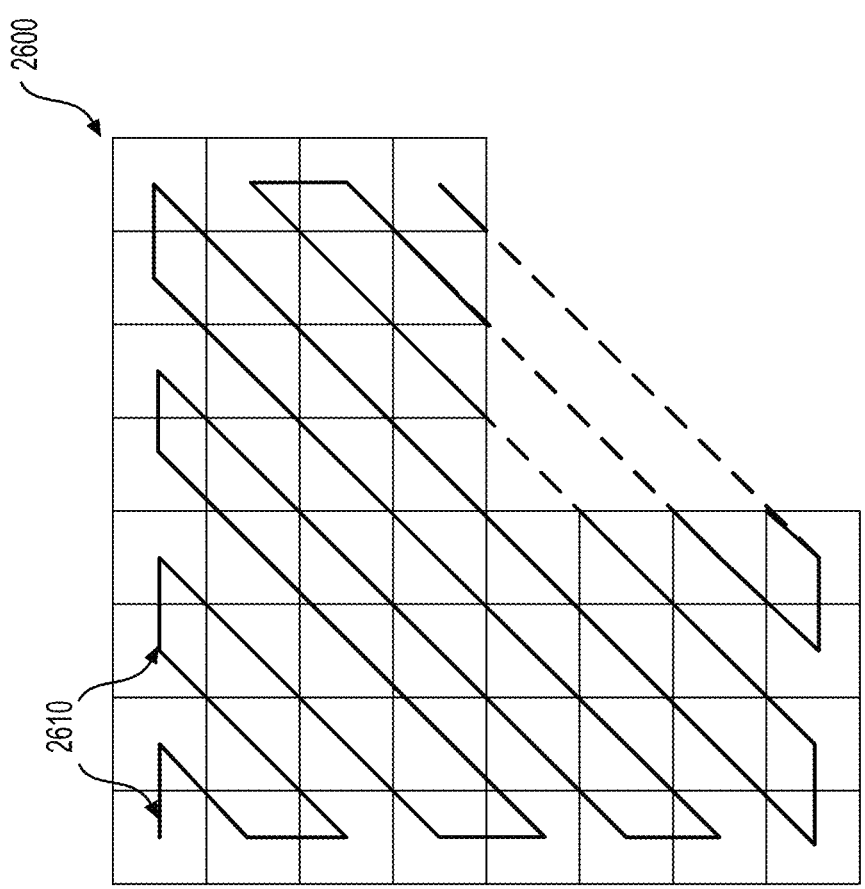
FIG. 26 shows an example of a scan order of an L-shaped partition according to an embodiment of the disclosure.

FIG. 26 shows an example of a scan order of an L-shaped partition (2600) according to an embodiment of the disclosure. In the FIG. 26 example, a zig-zag scan order (2610) for an 8×8 block is firstly derived, then the scan order for the L-shaped partition is derived by skipping samples outside the L-shaped partition. In the FIG. 26 examples, the actual scan positions in the L-shaped partition are shown by solid times and the skipped positions outside the L-shaped partition are shown by dotted lines.

In some embodiments, a non-separable transform is used in 2-dimensional transform on an L-partition. In an embodiment, the non-separable transform can be a KLT. Using the L-shaped partition in FIG. 26 as an example, the L-shaped partition (2600) includes 48 samples, and the 48 samples can form a vector of 48 elements, and then KLT transform can be performed on the vector to generate, for example 48 transform coefficients.

In some embodiments, when performing 2-dimensional transform on an L-partition, padding can be performed to add additional samples at positions outside of the L-shaped partition, and then the added samples and the samples in the L-shaped partition can form a virtual rectangular block. Further, 2-D transform techniques for rectangular blocks can be applied to the virtual rectangular block to derive the transform coefficients for this L-partition.

In an embodiment, the additional samples are derived using the existing samples in the L-shaped partition.

In another embodiment, the additional samples are derived using pre-defined values.

Figure 27:
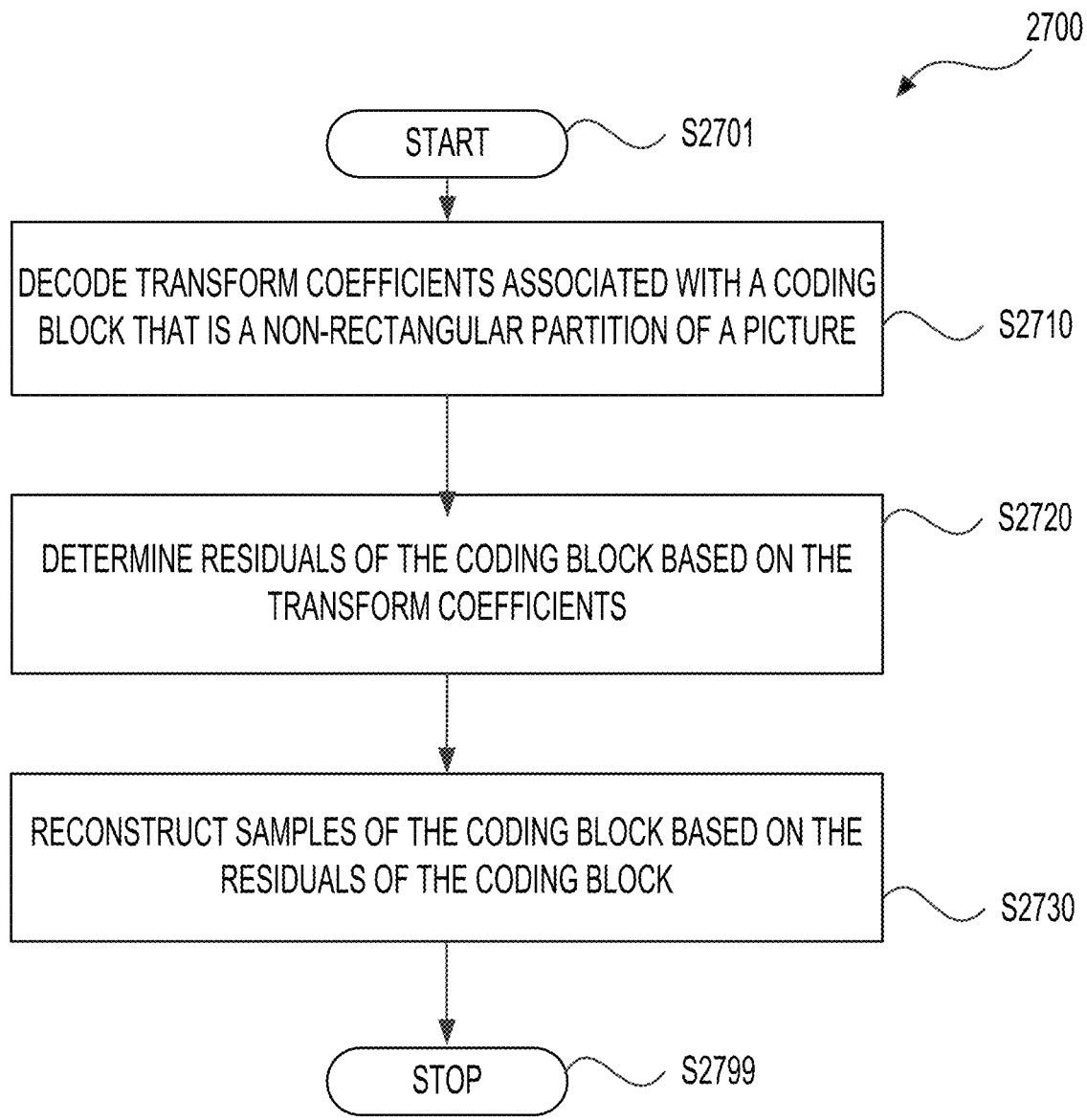
FIG. 27 shows a flow chart outlining a process example according to some embodiments of the disclosure.

FIG. 27 shows a flow chart outlining a process (2700) according to an embodiment of the disclosure. The process (2700) can be used in the reconstruction of a block, so to generate a prediction block for the block under reconstruction. In various embodiments, the process (2700) are executed by processing circuitry, such as the processing circuitry in the terminal devices (110), (120), (130) and (140), the processing circuitry that performs functions of the video encoder (203), the processing circuitry that performs functions of the video decoder (210), the processing circuitry that performs functions of the video decoder (310), the processing circuitry that performs functions of the video encoder (403), and the like. In some embodiments, the process (2700) is implemented in software instructions, thus when the processing circuitry executes the software instructions, the processing circuitry performs the process (2700). The process starts at (S2701) and proceeds to (S2710).

At (S2710), transform coefficients associated with a coding block that is a non rectangular partition of a picture are decoded from a coded video bitstream.

In some embodiments, at the encoder side, transform coefficients in a transform unit of the non rectangular partition can be scanned following a scan order for a rectangular unit that encompasses the non rectangular partition with positions outside of the non rectangular partition being skipped. Thus, at the decoder side, a transform unit for the non rectangular partition can be formed by following a scan order for a rectangular unit that encompasses the non rectangular partition, and skipping positions that are out of the non rectangular partition.

At (S2720), residuals of the coding block are determined based on the transform coefficients.

According to some aspects of the disclosure, the transform coefficients are generated on the encoder side by further partitioning of the non rectangular partition into two or more rectangular partitions, then on the decoder side, residuals for the respective rectangular partitions can be respectively determined based on the transform coefficients. In some embodiments, on the decoder side, first residuals of a first rectangular sub-block are determined based on first transform coefficients in the transform coefficients. The first rectangular sub-block is a first partition of the non rectangular partition. Further, second residuals of a second rectangular sub-block are determined based on second transform coefficients in the transform coefficients. The second rectangular sub-block is a second partition of the non rectangular partition. The second rectangular sub-block can have the same size as the first rectangular sub-block or can have different size from the first rectangular sub-block. In some embodiments, residuals of more than two rectangular sub-blocks can be determined from the transform coefficients. In some examples, the rectangular sub-blocks can have square shape.

According to some other aspects of the disclosure, the transform coefficients are generated on the encoder side by performing transform on the whole non rectangular portion, then on the decoder side, inverse transform are suitably applied to the transform coefficients to determine the residuals.

In some embodiments, the encoder side applies separable 2-dimensional transform. At the decoder side, in some examples, intermediate transform coefficients of an intermediate transform unit are determined by performing inverse transform of a transform unit in a first direction. The transform unit is formed by the transform coefficients. Then, the residuals of the coding block are determined by performing inverse transform of the intermediate transform unit in a second direction. In some examples, the intermediate transform unit and the transform unit can have the same shape and size as the non rectangular partition. In some other examples, alignment may be performed at the encoder side to achieve better coding efficiency, thus at the decoder side, re-alignment may be performed before inverse transform.

In some examples, the first direction is vertical direction and the second direction is horizontal direction. For example, first inverse transform operations are performed respectively on first columns of the transform unit. The first inverse transform operations respectively are a first number of points inverse transform, such as 8-point inverse transform in an example. Second inverse transform operations are performed respectively on second columns of the transform unit. The second inverse transform respectively are a second number of points inverse transform, such as 4-pint inverse transform in an example. Further, third inverse transform operations are performed respectively on first rows of the intermediate transform unit. The third inverse transform operations respectively are a third number of points inverse transform, such as 8-point inverse transform in an example. Fourth inverse transform operations are then performed respectively on second rows of the intermediate transform unit. The fourth inverse transform operations respectively are a fourth number of points inverse transform, such as four-point inverse transform in an example.

In some examples, the first direction is horizontal direction and the second direction is vertical direction. For example, first inverse transform operations are performed respectively on first rows of the transform unit. The first inverse transform operations respectively are a first number of points inverse transform, such as 4-point inverse transform in an example. Second inverse transform operations are performed respectively on second rows of the transform unit. The second inverse transform respectively are a second number of points inverse transform, such as 8-point inverse transform in an example. Further, third inverse transform operations are respectively performed on first columns of the intermediate transform unit. The third inverse transform operations respectively are a third number of points inverse transform, such as 4-point inverse transform in an example. Fourth inverse transform operations are performed respectively on second columns of the intermediate transform unit. The fourth inverse transform operations respectively are a fourth number of points inverse transform, such as 8-point inverse transform in an example.

According to another aspect of the disclosure, the transform coefficients are generated on the encoder side by Karhunen-Loeve transform (KLT) on the whole non rectangular portion, then on the decoder side, inverse Karhunen-Loeve transform (KLT) can be suitably applied to the transform coefficients to determine the residuals.

According to another aspect of the disclosure, at the encoder side, padding can be performed to add additional samples to the coding block to make a rectangular unit that encompass the non rectangular partition, and then transform can be performed on the rectangular unit. Thus, at the decoder side, in some embodiments, first residuals of a rectangular unit that includes the non rectangular partition can be determined by performing 2-dimensional inverse transform of the transform coefficients, and then the residuals of the coding block can be selected from the first residuals of the rectangular unit.

At (S2730) samples of the coding block are reconstructed based on the residuals. For example, suitable prediction of the coding block can be performed, and then the residuals are suitably added to the prediction. Then the process proceeds to S2799 and terminates.

The techniques described above, can be implemented as computer software using computer-readable instructions and physically stored in one or more computer-readable media. For example, FIG. 28 shows a computer system (2800) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 28:
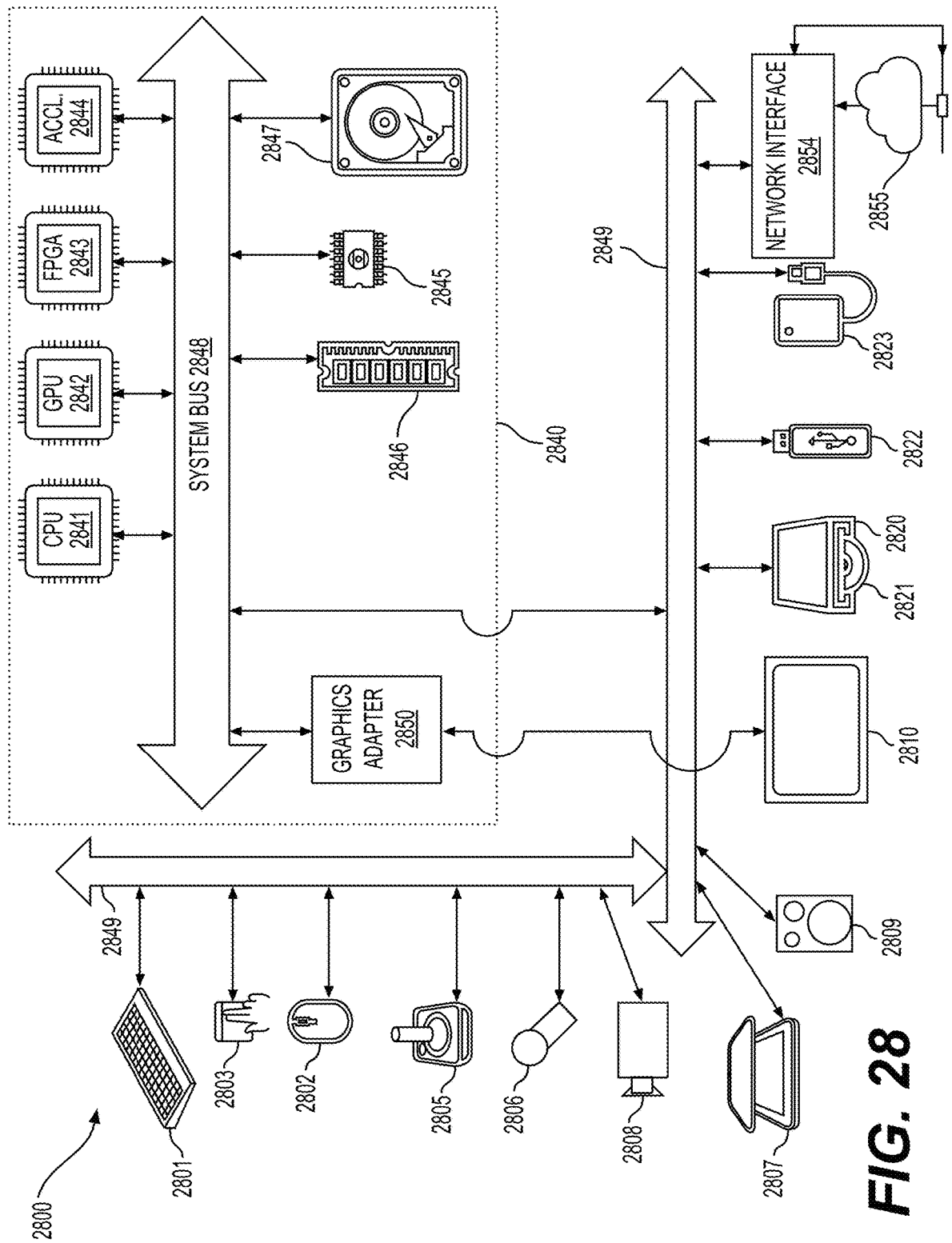
FIG. 28 is a schematic illustration of a computer system in accordance with an embodiment.

The components shown in FIG. 28 for computer system (2800) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (2800).

Computer system (2800) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (2801), mouse (2802), trackpad (2803), touch screen (2810), data-glove (not shown), joystick (2805), microphone (2806), scanner (2807), camera (2808).

Computer system (2800) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (2810), data-glove (not shown), or joystick (2805), but there can also be tactile feedback devices that do not serve as input devices), audio output devices (such as: speakers (2809), headphones (not depicted)), visual output devices (such as screens (2810) to include CRT screens, LCD screens, plasma screens, OLED screens, each with or without touch-screen input capability, each with or without tactile feedback capability-some of which may be capable to output two dimensional visual output or more than three dimensional output through means such as stereographic output; virtual-reality glasses (not depicted), holographic displays and smoke tanks (not depicted)), and printers (not depicted).

Computer system (2800) can also include human accessible storage devices and their associated media such as optical media including CD/DVD ROM/RW (2820) with CD/DVD or the like media (2821), thumb-drive (2822), removable hard drive or solid state drive (2823), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (2800) can also include an interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (2849) (such as, for example USB ports of the computer system (2800)); others are commonly integrated into the core of the computer system (2800) by attachment to a system bus as described below (for example Ethernet interface into a PC computer system or cellular network interface into a smartphone computer system). Using any of these networks, computer system (2800) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (2840) of the computer system (2800).

The core (2840) can include one or more Central Processing Units (CPU) (2841), Graphics Processing Units (GPU) (2842), specialized programmable processing units in the form of Field Programmable Gate Areas (FPGA) (2843), hardware accelerators for certain tasks (2844), and so forth. These devices, along with Read-only memory (ROM) (2845), Random-access memory (2846), internal mass storage such as internal non-user accessible hard drives, SSDs, and the like (2847), may be connected through a system bus (2848). In some computer systems, the system bus (2848) can be accessible in the form of one or more physical plugs to enable extensions by additional CPUs, GPU, and the like. The peripheral devices can be attached either directly to the core's system bus (2848), or through a peripheral bus (2849). Architectures for a peripheral bus include PCI, USB, and the like.

CPUs (2841), GPUs (2842), FPGAs (2843), and accelerators (2844) can execute certain instructions that, in combination, can make up the aforementioned computer code. That computer code can be stored in ROM (2845) or RAM (2846). Transitional data can be also be stored in RAM (2846), whereas permanent data can be stored for example, in the internal mass storage (2847). Fast storage and retrieve to any of the memory devices can be enabled through the use of cache memory, that can be closely associated with one or more CPU (2841), GPU (2842), mass storage (2847), ROM (2845), RAM (2846), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system (2800) having architecture shown in FIG. 28, and specifically the core (2840) can provide functionality as a result of processor(s) (including CPU, GPUs, FPGA, accelerators, and the like) executing software embodied in one or more tangible, computer-readable media. Such computer-readable media can be media associated with user-accessible mass storage as introduced above, as well as certain storage of the core (2840) that are of non-transitory nature, such as core-internal mass storage (2847) or ROM (2845). The software implementing various embodiments of the present disclosure can be stored in such devices and executed by core (2840). A computer-readable medium can include one or more memory devices or chips, according to particular needs. The software can cause the core (2840) and specifically the processors therein (including CPU, GPU, FPGA, and the like) to execute particular processes or particular parts of particular processes described herein, including defining data structures stored in RAM (2846) and modifying such data structures according to the processes defined by the software. In addition or as an alternative, the computer system can provide functionality as a result of logic hardwired or otherwise embodied in a circuit (for example: accelerator (2844)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

Appendix A: Acronyms
  JEM: joint exploration model
  VVC: versatile video coding
  BMS: benchmark set
  MV: Motion Vector
  HEVC: High Efficiency Video Coding
  SEI: Supplementary Enhancement Information
  VUI: Video Usability Information
  GOPs: Groups of Pictures
  TUs: Transform Units,
  PUs: Prediction Units
  CTUs: Coding Tree Units
  CTBs: Coding Tree Blocks
  PBs: Prediction Blocks
  HRD: Hypothetical Reference Decoder
  SNR: Signal Noise Ratio
  CPUs: Central Processing Units
  GPUs: Graphics Processing Units
  CRT: Cathode Ray Tube
  LCD: Liquid-Crystal Display
  OLED: Organic Light-Emitting Diode
  CD: Compact Disc
  DVD: Digital Video Disc
  ROM: Read-Only Memory
  RAM: Random Access Memory
  ASIC: Application-Specific Integrated Circuit
  PLD: Programmable Logic Device
  LAN: Local Area Network
  GSM: Global System for Mobile communications
  LTE: Long-Term Evolution
  CANBus: Controller Area Network Bus
  USB: Universal Serial Bus PCI: Peripheral Component Interconnect
FPGA: Field Programmable Gate Areas
SSD: solid-state drive
IC: Integrated Circuit
CU: Coding Unit
TSM: Transform Skip Mode
IBC: Intra Block Copy
DPCM: Differential pulse-code modulation
BDPCM: Block based DPCM While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for video decoding in a decoder, comprising:
    decoding, by a processor and from a coded video bitstream, transform coefficients associated with a coding block that is an L-shaped partition of a picture;
    partitioning the L-shaped partition of the picture into a plurality of rectangular sub-blocks when the coding block is the L-shaped partition, each corner of the L-shaped partition being a right angle;
    determining, by the processor, residuals of each of the plurality of rectangular sub-blocks in the coding block based on the transform coefficients of the respective rectangular sub-block; and
    reconstructing, by the processor, samples of the coding block based on the residuals of the coding block.

2. The method of claim 1, wherein the determining the residuals comprises:
    determining, by the processor, first residuals of a first rectangular sub-block of the plurality of rectangular sub-blocks based on first transform coefficients in the transform coefficients, the first rectangular sub-block being a first partition of the L-shaped partition.

3. The method of claim 2, wherein the determining the residuals comprises:
    determining, by the processor, second residuals of a second rectangular sub-block of the plurality of rectangular sub-blocks based on second transform coefficients in the transform coefficients, the second rectangular sub-block being a second partition of the L-shaped partition and having a same size as the first rectangular sub-block.

4. The method of claim 2, wherein the determining the residuals comprises:
    determining, by the processor, second residuals of a second rectangular sub-block of the plurality of rectangular sub-blocks based on second transform coefficients in the transform coefficients, the second rectangular sub-block being a second partition of the L-shaped partition and having a different size from the first rectangular sub-block.

5. The method of claim 1, wherein the determining the residuals comprises:
    determining intermediate transform coefficients of an intermediate transform unit by performing inverse transform of a transform unit in a first direction, the transform unit being formed by the transform coefficients; and
    determining the residuals of the coding block by performing inverse transform of the intermediate transform unit in a second direction.

6. The method of claim 5, further comprising:
    performing, first inverse transform operations respectively on first columns of the transform unit, the first inverse transform operations respectively being a first number of points inverse transform;
    performing, second inverse transform operations respectively on second columns of the transform unit, the second inverse transform operations respectively being a second number of points inverse transform;
    performing, third inverse transform operations respectively on first rows of the intermediate transform unit, the third inverse transform operations respectively being a third number of points inverse transform; and
    performing, fourth inverse transform operations respectively on second rows of the intermediate transform unit, the fourth inverse transform operations respectively being a fourth number of points inverse transform.

7. The method of claim 5, further comprising:
    performing, first inverse transform operations respectively on first rows of the transform unit, the first inverse transform operations respectively being a first number of points inverse transform;
    performing, second inverse transform operations respectively on second rows of the transform unit, the second inverse transform operations respectively being a second number of points inverse transform;
    performing, third inverse transform operations respectively on first columns of the intermediate transform unit, the third inverse transform operations respectively being a third number of points inverse transform; and
    performing, fourth inverse transform operations respectively on second columns of the intermediate transform unit, the fourth inverse transform operations respectively being a fourth number of points inverse transform.

8. The method of claim 1, wherein the determining the residuals comprises:
    determining, by the processor, the residuals of the coding block by performing an inverse Karhunen-Loeve transform (KLT) of the transform coefficients.

9. The method of claim 1, wherein the determining the residuals comprises:
    determining, by the processor, first residuals of a rectangular unit that includes the L-shaped partition by performing 2-dimensional inverse transform of the transform coefficients; and
    selecting, by the processor, the residuals of the coding block from the first residuals of the rectangular unit.

10. The method of claim 1, further comprising:
    forming a transform unit for the L-shaped partition by following a scan order for a rectangular unit that encompasses the L-shaped partition; and
    skipping a scan position that is out of the L-shaped partition.

11. A method for video encoding in an encoder, comprising:
    partitioning a coding block of a picture into a plurality of rectangular sub-blocks when the coding block is an L-shaped partition of the picture, each corner of the L-shaped partition being a right angle;
    determining, by processing circuitry, transform coefficients of each of the plurality of rectangular sub-blocks based on residuals of the respective rectangular sub-blocks in the coding block; and
    encoding the transform coefficients of the coding block in a bitstream.

12. The method of claim 11, wherein the determining the transform coefficients comprises:
  determining first transform coefficients in the transform coefficients based on first residuals of a first rectangular sub-block of the plurality of rectangular sub-blocks, the first rectangular sub-block being a first partition of the L-shaped partition.

13. The method of claim 12, wherein the determining the transform coefficients comprises:
  determining second transform coefficients in the transform coefficients based on second residuals of a second rectangular sub-block of the plurality of rectangular sub-blocks, the second rectangular sub-block being a second partition of the L-shaped partition and having a same size as the first rectangular sub-block.

14. The method of claim 12, wherein the determining the transform coefficients comprises:
  determining second transform coefficients in the transform coefficients based on second residuals of a second rectangular sub-block of the plurality of rectangular sub-blocks, the second rectangular sub-block being a second partition of the L-shaped partition and having a different size from the first rectangular sub-block.

15. The method of claim 11, further comprising:
  determining the residuals of the coding block by performing an inverse Karhunen-Loeve transform (KLT) of the transform coefficients.

16. The method of claim 11, further comprising:
  determining first residuals of a rectangular unit that includes the L-shaped partition by performing 2-dimensional inverse transform of the transform coefficients; and
  selecting the residuals of the coding block from the first residuals of the rectangular unit.

17. A method of processing visual media data, the method comprising:
  processing a bitstream that includes the visual media data according to a format rule, wherein
    the bitstream includes transform coefficients associated with a coding block that is an L-shaped partition of a picture; and
    the format rule specifies that
      the L-shaped partition of the picture is partitioned into a plurality of rectangular sub-blocks when the coding block is the L-shaped partition, each corner of the L-shaped partition being a right angle;
      residuals of each of the plurality of rectangular sub-blocks in the coding block are determined based on the transform coefficients of the respective rectangular sub-block; and
      samples of the coding block are processed based on the residuals of the coding block.

18. The method of claim 17, wherein the format rule specifies that:
  first residuals of a first rectangular sub-block of the plurality of rectangular sub-blocks are determined based on first transform coefficients in the transform coefficients, the first rectangular sub-block being a first partition of the L-shaped partition.

19. The method of claim 18, wherein the format rule specifies that:
  second residuals of a second rectangular sub-block of the plurality of rectangular sub-blocks are determined based on second transform coefficients in the transform coefficients, the second rectangular sub-block being a second partition of the L-shaped partition and having a same size as the first rectangular sub-block.

20. The method of claim 18, wherein the format rule specifies that:
  second residuals of a second rectangular sub-block of the plurality of rectangular sub-blocks are determined based on second transform coefficients in the transform coefficients, the second rectangular sub-block being a second partition of the L-shaped partition and having a different size from the first rectangular sub-block.

* * * * *